United States Patent
Kirby et al.

(10) Patent No.: US 11,921,677 B1
(45) Date of Patent: Mar. 5, 2024

(54) SHARING NAMESPACES ACROSS FILE SYSTEM CLUSTERS

(71) Applicant: Qumulo, Inc., Seattle, WA (US)

(72) Inventors: Michael Patrick Kirby, Lynnwood, WA (US); Austin Elery Voecks, Bainbridge Island, WA (US); Alan Francisco Delgado Duran, Seattle, WA (US); Noah Trent Nelson, Seattle, WA (US); Thomas Scott Urban, Seattle, WA (US); Benjamin Gregory Reeves, Chicago, IL (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/503,791

(22) Filed: Nov. 7, 2023

(51) Int. Cl.
| | |
|---|---|
| G06F 12/00 | (2006.01) |
| G06F 16/00 | (2019.01) |
| G06F 16/17 | (2019.01) |
| G06F 16/176 | (2019.01) |
| G06F 16/182 | (2019.01) |

(52) U.S. Cl.
CPC ........ *G06F 16/176* (2019.01); *G06F 16/1734* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 5,165,031 A | 11/1992 | Pruul et al. | |
| 5,283,875 A | 2/1994 | Gibson et al. | |
| 5,319,773 A | 6/1994 | Britton et al. | |
| 5,410,684 A | 4/1995 | Ainsworth et al. | |
| 5,410,719 A | 4/1995 | Shackleford | |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

International Search Report and Written Opinion for International Patent Application No. PCT/US2021/023531 dated Jul. 6, 2021, 6 Pages.

(Continued)

*Primary Examiner* — Tuan A Pham
(74) *Attorney, Agent, or Firm* — John W. Branch; Branch Partners PLLC

(57) ABSTRACT

Embodiments are directed to sharing namespaces across file system clusters. A file in a spoke file system may be determined based on a command provided to the spoke file system such that the file may be associated with an inode mask. Data blocks associated with the file may be determined based on the command and the inode mask such that the data blocks may be absent from the spoke file system. Requests for leases may be generated based on the absent data blocks such that each lease request corresponds to a portion of the absent data blocks Employing the leases provided by a hub file system to: copy the absent data blocks from the hub file system where each portion of absent data blocks may be associated with a lease; updating the inode mask to include the leases and each copied portion of absent blocks.

24 Claims, 15 Drawing Sheets

(56) References Cited

U.S. PATENT DOCUMENTS

| | | |
|---|---|---|
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B1 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B2 | 4/2020 | Liang et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,256,682 B2 | 2/2022 | Taron et al. |
| 11,265,262 B1 | 3/2022 | Makie et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |

(56) References Cited

U.S. PATENT DOCUMENTS

| | | |
|---|---|---|
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1* | 1/2013 | Clymer ............... G06Q 10/101 709/223 |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |

(56) References Cited

U.S. PATENT DOCUMENTS

| | | |
|---|---|---|
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1* | 6/2020 | Nishimoto ............ G06F 16/172 |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |

FOREIGN PATENT DOCUMENTS

| | | |
|---|---|---|
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |

(56) References Cited

FOREIGN PATENT DOCUMENTS

| WO | 2016/205752 A1 | 12/2016 |
|---|---|---|
| WO | 2021/151107 A1 | 7/2021 |
| WO | 2021/189055 A2 | 9/2021 |

OTHER PUBLICATIONS

Office Communication for U.S. Appl. No. 17/062,500 dated Jul. 12, 2021, 18 Pages.
Office Communication for U.S. Appl. No. 16/775,041 dated Jul. 21, 2021, 11 Pages.
Office Communication for U.S. Appl. No. 17/114,384 dated Aug. 3, 2021, 4 Pages.
Office Communication for U.S. Appl. No. 14/595,598 dated Aug. 6, 2021, 20 Pages.
Office Communication for U.S. Appl. No. 17/115,529 dated Aug. 12, 2021, 4 Pages.
Office Communication for U.S. Appl. No. 17/190,653 dated Aug. 27, 2021, 11 Pages.
Office Communication for U.S. Appl. No. 17/114,384 dated Sep. 2, 2021, 5 Pages.
Office Communication for U.S. Appl. No. 16/152,277 dated Sep. 3, 2021, 4 Pages.
Office Communication for U.S. Appl. No. 16/004,182 dated Sep. 10, 2021, 4 Pages.
Office Communication for U.S. Appl. No. 16/004,182 dated Sep. 29, 2021, 11 Pages.
Office Communication for U.S. Appl. No. 17/491,017 dated Dec. 23, 2021, 41 Pages.
Office Communication for U.S. Appl. No. 17/491,017 dated May 12, 2022, 50 Pages.
Office Communication for U.S. Appl. No. 17/491,017 dated Sep. 15, 2022, 55 Pages.
Office Communication for U.S. Appl. No. 17/491,017 dated Feb. 10, 2023, 55 Pages.
Office Communication for U.S. Appl. No. 17/491,017 dated Aug. 8, 2023, 13 Pages.
Office Communication for U.S. Appl. No. 14/595,598 dated May 16, 2019, 18 Pages.
Office Communication for U.S. Appl. No. 16/152,277 dated Oct. 26, 2021, 2 Pages.
Office Communication for U.S. Appl. No. 16/004,182 dated Mar. 17, 2022, 3 Pages.
Office Communication for U.S. Appl. No. 16/226,587 dated Jan. 27, 2020, 13 Pages.
Office Communication for U.S. Appl. No. 16/741,567 dated Feb. 24, 2022, 2 Pages.
Office Communication for U.S. Appl. No. 16/234,334 dated Oct. 11, 2019, 16 Pages.
Office Communication for U.S. Appl. No. 16/262,790 dated Nov. 8, 2019, 5 Pages.
Office Communication for U.S. Appl. No. 17/504,289 dated Apr. 20, 2022, 2 Pages.
Office Communication for U.S. Appl. No. 16/659,488 dated May 6, 2020, 8 Pages.
International Preliminary Report on Patentability Chapter I for International Patent Application No. PCT/US2021/023531 dated Aug. 4, 2022, 5 Pages.
International Preliminary Report on Patentability Chapter I for International Patent Application No. PCT/US2021/023525 dated Aug. 4, 2022, 5 Pages.
International Preliminary Report on Patentability Chapter I for International Patent Application No. PCT/US2016/038242 dated Dec. 28, 2017, 8 Pages.
Office Action for European Patent Application No. 17206518.7 dated Mar. 15, 2022, 5 Pages.
Intention to Grant for European Patent Application No. 17206518.7 dated Sep. 30, 2022, 6 Pages.
Office Communication for U.S. Appl. No. 17/508,869 dated Mar. 8, 2022, 2 Pages.
Office Communication for U.S. Appl. No. 17/508,869 dated Jan. 5, 2022, 3 Pages.
Office Communication for U.S. Appl. No. 17/508,869 dated Dec. 22, 2021, 9 Pages.
Office Communication for U.S. Appl. No. 17/530,420 dated May 4, 2022, 3 Pages.
Office Communication for U.S. Appl. No. 17/530,420 dated May 12, 2022, 3 Pages.
Office Communication for European Patent Application No. 16812585.4 dated Apr. 1, 2021, 9 pages.
Intention to Grant for European Patent Application No. 18155779.4 dated Jun. 12, 2020, 10 Pages.
Office Communication for U.S. Appl. No. 17/115,529 dated Sep. 12, 2023, 25 Pages.
Office Communication for U.S. Appl. No. 17/491,017 dated May 4, 2023, 6 Pages.
Office Communication for U.S. Appl. No. 17/491,017 dated Aug. 17, 2022, 5 Pages.
Office Communication for U.S. Appl. No. 17/864,190 dated Aug. 25, 2023, 12 Pages.
Office Communication for U.S. Appl. No. 18/070,705 dated Sep. 7, 2023, 5 Pages.
Office Communication for European Patent Application No. 18155779.4 dated Apr. 17, 2018, 4 Pages.
Office Communication for U.S. Appl. No. 17/864,190 dated Nov. 17, 2023, 12 Pages.
Office Communication for U.S. Appl. No. 14/859,114 dated Jun. 27, 2018, 33 pages.
Office Communication for U.S. Appl. No. 14/859,114 dated Nov. 19, 2018, 35 Pages.
Office Communication for U.S. Appl. No. 14/859,114 dated Jan. 31, 2019, 4 Pages.
Office Communication for U.S. Appl. No. 14/859,114 dated Mar. 7, 2019, 32 Pages.
Office Communication for U.S. Appl. No. 14/859,114 dated Jun. 26, 2019, 21 Pages.
Office Communication for U.S. Appl. No. 14/859,114 dated Sep. 13, 2019, 6 Pages.
Office Communication for U.S. Appl. No. 14/859,114 dated Nov. 26, 2019, 21 Pages.
Office Communication for U.S. Appl. No. 15/288,853 dated Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, 25 Pages.
Cudre-Mauroux, Philippe et aL, "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 dated Jul. 11, 2019, 9 Pages.
Office Communication for U.S. Appl. No. 15/474,047 dated Sep. 18, 2017, 14 Pages.
Office Communication for U.S. Appl. No. 15/474,047 dated Mar. 9, 2018, 8 Pages.
Office Communication for U.S. Appl. No. 15/474,047 dated Jun. 11, 2018, 6 Pages.
Office Communication for U.S. Appl. No. 15/474,047 dated Aug. 15, 2018, 11 Pages.
Office Communication for U.S. Appl. No. 15/957,809 dated Jun. 28, 2018, 27 Pages.
Office Communication for U.S. Appl. No. 15/957,809 dated Jan. 24, 2019, 11 Pages.
Office Communication for U.S. Appl. No. 16/434,157 dated Jul. 25, 2019, 8 Pages.
Office Communication for U.S. Appl. No. 15/854,447 dated May 6, 2019, 9 pages.
Office Communication for U.S. Appl. No. 16/505,562 dated Aug. 30, 2019, 11 Pages.

(56) References Cited

OTHER PUBLICATIONS

Extended European Search Report for European Patent Application No. 17206518.7 dated Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, 46 Pages.
Office Communication for U.S. Appl. No. 16/125,573 dated Nov. 21, 2019, 13 Pages.
Office Communication for U.S. Appl. No. 16/226,587 dated Oct. 24, 2019, 4 Pages.
Office Communication for U.S. Appl. No. 16/262,790 dated Dec. 12, 2019, 10 Pages.
Office Communication for U.S. Appl. No. 16/234,334 dated Jan. 16, 2020, 8 Pages.
Office Communication for U.S. Appl. No. 15/694,604 dated Nov. 20, 2019, 8 Pages.
Office Communication for U.S. Appl. No. 16/262,756 dated Jan. 28, 2020, 21 Pages.
Office Communication for U.S. Appl. No. 16/434,157 dated Jan. 29, 2020, 9 Pages.
Office Communication for U.S. Appl. No. 16/262,790 dated Feb. 6, 2020, 8 Pages.
Office Communication for U.S. Appl. No. 14/859,114 dated Mar. 13, 2020, 21 Pages.
Office Communication for U.S. Appl. No. 16/752,451 dated Mar. 12, 2020, 14 Pages.
Office Communication for U.S. Appl. No. 16/775,041 dated Mar. 11, 2020, 8 pages.
Office Communication for U.S. Appl. No. 16/779,362 dated Mar. 26, 2020, 10 Pages.
Wikipedia clustered file system page from elate Jul. 9, 2019, retrieved using the WayBackMachine, From https//web.archive.org/web/20190709083400/tlttps://en.wikipedia.org/wiki/Clustered_file_system (Year: 2019), pp. 1-6.
Wikipedia raft page from date Jul. 16, 2019, retrieved using the WayBackMachine, from tlttps://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, 4 Pages.
Office Communication for U.S. Appl. No. 16/752,509 dated Apr. 2, 2020, 8 Pages.
Office Communication for U.S. Appl. No. 16/152,277 dated Apr. 3, 2020, 10 Pages.
Office Communication for U.S. Appl. No. 16/004,182 dated Apr. 28, 2020, 51 Pages.
Office Communication for U.S. Appl. No. 16/152,259 dated Apr. 29, 2020, 19 Pages.
Office Communication for U.S. Appl. No. 14/859,114 dated Jun. 5, 2020, 5 Pages.
Office Communication for U.S. Appl. No. 16/262,756 dated Jun. 8, 2020, 22 Pages.
Office Communication for U.S. Appl. No. 14/595,598 dated Jul. 9, 2020, 19 Pages.
Office Communication for U.S. Appl. No. 16/752,451 dated Jul. 23, 2020, 8 Pages.
Office Communication for U.S. Appl. No. 14/859,114 dated Jul. 23, 2020, 21 Pages.
Office Communication for U.S. Appl. No. 16/152,615 dated Aug. 6, 2020, 7 Pages.
Office Communication for U.S. Appl. No. 16/779,362 dated Aug. 7, 2020, 11 Pages.
Office Communication for U.S. Appl. No. 17/062,500 dated Oct. 27, 2021, 17 Pages.
Office Communication for U.S. Appl. No. 14/595,598 dated Oct. 28, 2021, 6 Pages.
Office Communication for U.S. Appl. No. 16/741,567 dated Oct. 28, 2021, 11 Pages.
Office Communication for U.S. Appl. No. 17/203,452 dated Nov. 2, 2021, 13 Pages.
Office Communication for U.S. Appl. No. 17/190,653 dated Nov. 10, 2021, 6 Pages.
Office Communication for U.S. Appl. No. 17/484,167 dated Nov. 18, 2021, 15 Pages.
Office Communication for U.S. Appl. No. 17/504,289 dated Dec. 7, 2021, 15 Pages.
Office Communication for U.S. Appl. No. 17/114,384 dated Dec. 14, 2021, 7 Pages.
Office Communication for U.S. Appl. No. 16/226,587 dated Aug. 5, 2019, 46 Pages.
Office Communication for U.S. Appl. No. 16/228,716 dated Jun. 24, 2019, 10 Pages.
Office Communication for U.S. Appl. No. 16/231,354 dated Jul. 10, 2019, 8 Pages.
Office Communication for U.S. Appl. No. 16/262,756 dated Aug. 5, 2019, 35 Pages.
Office Communication for U.S. Appl. No. 15/967,499 dated Jun. 27, 2018, 16 Pages.
Office Communication for U.S. Appl. No. 16/226,587 dated Feb. 25, 2019, 43 Pages.
Office Communication for U.S. Appl. No. 16/228,716 dated Feb. 28, 2019, 15 Pages.
Office Communication for U.S. Appl. No. 16/231,354 dated Mar. 25, 2019, 10 Pages.
Office Communication for U.S. Appl. No. 16/262,756 dated Apr. 2, 2019, 29 Pages.
Office Communication for U.S. Appl. No. 16/262,790 dated Aug. 23, 2019, 16 Pages.
Office Communication for U.S. Appl. No. 16/262,790 dated Apr. 18, 2019, 14 Pages.
Office Communication for U.S. Appl. No. 16/262,756 dated Oct. 25, 2019, 4 Pages.
Office Communication for U.S. Appl. No. 16/659,488 dated Dec. 30, 2019, 6 Pages.
Office Communication for U.S. Appl. No. 14/595,598 dated Dec. 31, 2019, 16 Pages.
Office Communication for U.S. Appl. No. 16/004,208 dated Aug. 27, 2018, 11 Pages.
Office Communication for U.S. Appl. No. 16/234,395 dated Aug. 8, 2019, 10 Pages.
Office Communication for U.S. Appl. No. 16/234,334 dated Apr. 5, 2019, 15 Pages.
Office Communication for U.S. Appl. No. 16/234,395 dated Mar. 28, 2019, 10 Pages.
Kappes, Giorgos et al., "Dike: Virtualization-awarn Access Control for Multitenant Filesystems", Feb. 18, 2013, pp. 1-6.
HiTZ, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 dated Jun. 30, 2017, 23 Pages.
Extended European Search Report for European Patent Application No. 18155779.4 dated Apr. 17, 2018, 15 Pages.
Office Communication for U.S. Appl. No. 16/004,182 dated Aug. 23, 2018, 43 Pages.
Office Communication for U.S. Appl. No. 16/004,182 dated Mar. 5, 2019, 46 Pages.
Office Communication for U.S. Appl. No. 16/004,182 dated Jul. 3, 2019, 45 Pages.
Office Communication for U.S. Appl. No. 15/694,604 dated Jun. 3, 2019, 8 Pages.
Office Communication for U.S. Appl. No. 16/004,182 dated May 22, 2019, 4 Pages.
Office Communication for U.S. Appl. No. 14/595,043 dated May 4, 2017, 30 Pages.
Office Communication for U.S. Appl. No. 14/595,043 dated Feb. 23, 2018, 16 Pages.
Office Communication for U.S. Appl. No. 14/595,043 dated May 25, 2018, 7 Pages.

(56) References Cited

OTHER PUBLICATIONS

Office Communication for U.S. Appl. No. 14/595,043 dated Oct. 5, 2018, 17 Pages.
Office Communication for U.S. Appl. No. 14/595,043 dated Jun. 7, 2019, 19 Pages.
Office Communication for U.S. Appl. No. 14/595,043 dated Aug. 27, 2019, 17 Pages.
Office Communication for U.S. Appl. No. 14/658,015 dated Apr. 27, 2017, 7 Pages.
Office Communication for U.S. Appl. No. 14/658,015 dated Jan. 4, 2018, 28 Pages.
Office Communication for U.S. Appl. No. 14/658,015 dated Jul. 13, 2018, 8 Pages.
Office Communication for U.S. Appl. No. 14/859,061 dated Sep. 22, 2017, 16 Pages.
Office Communication for U.S. Appl. No. 15/831,236 dated Mar. 30, 2018, 8 Pages.
Office Communication for U.S. Appl. No. 15/831,236 dated Aug. 15, 2018, 14 Pages.
Office Communication for U.S. Appl. No. 14/859,114 dated Jul. 24, 2017, 41 Pages.
Office Communication for U.S. Appl. No. 14/859,114 dated Feb. 21, 2018, 25 Pages.
Office Communication for U.S. Appl. No. 14/859,114 dated May 11, 2018, 5 Pages.
Office Communication for U.S. Appl. No. 16/883,922 dated Aug. 7, 2020, 13 Pages.
Office Communication for U.S. Appl. No. 16/775,041 dated Aug. 18, 2020, 9 Pages.
Office Communication for U.S. Appl. No. 16/883,879 dated Sep. 1, 2020, 11 Pages.
Extended European Search Report for European Patent Application No. 16812585.4 dated Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, 6 Pages.
International Search Report and Written Opinion for International Patent Application No. PCT/US2016/038242 dated Oct. 11, 2016, 9 Pages.
Office Communication for U.S. Appl. No. 14/595,598 dated Jul. 31, 2019, 5 Pages.
Office Communication for U.S. Appl. No. 14/595,598 dated Sep. 20, 2018, 18 Pages.
Office Communication for U.S. Appl. No. 14/595,598 dated Dec. 15, 2017, 18 Pages.
Office Communication for U.S. Appl. No. 14/595,598 dated Feb. 24, 2017, 8 Pages.
Office Communication for U.S. Appl. No. 14/595,598 dated Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, 7 Pages.
Office Communication for European Patent Application No. 18155779.4 dated Oct. 8, 2019, 4 Pages.
Office Communication for U.S. Appl. No. 16/152,259 dated Aug. 28, 2020, 5 Pages.
Office Communication for U.S. Appl. No. 16/752,509 dated Aug. 11, 2020, 7 Pages.
Office Communication for U.S. Appl. No. 14/595,598 dated Sep. 25, 2020, 7 Pages.
Office Communication for U.S. Appl. No. 16/152,277 dated Oct. 16, 2020, 10 Pages.
Office Communication for U.S. Appl. No. 16/152,615 dated Oct. 20, 2020, 7 Pages.
Office Communication for U.S. Appl. No. 16/775,041 dated Nov. 3, 2020, 5 Pages.
Office Communication for U.S. Appl. No. 17/062,500 dated Nov. 12, 2020, 12 Pages.
Office Communication for U.S. Appl. No. 16/004,182 dated Nov. 30, 2020, 55 Pages.
Office Communication for U.S. Appl. No. 14/859,114 dated Dec. 1, 2020, 24 Pages.
Office Communication for U.S. Appl. No. 16/883,922 dated Dec. 2, 2020, 9 Pages.
Office Communication for U.S. Appl. No. 16/883,879 dated Dec. 8, 2020, 5 Pages.
Office Communication for U.S. Appl. No. 16/152,277 dated Dec. 28, 2020, 5 Pages.
Office Communication for U.S. Appl. No. 16/004,182 dated Jan. 28, 2021, 4 Pages.
Office Communication for U.S. Appl. No. 14/595,598 dated Feb. 4, 2021, 19 Pages.
Office Communication for U.S. Appl. No. 17/115,529 dated Feb. 8, 2021, 15 Pages.
Office Communication for U.S. Appl. No. 16/262,756 dated Feb. 10, 2021, 19 Pages.
Office Communication for U.S. Appl. No. 17/114,384 dated Feb. 17, 2021, 12 Pages.
Office Action for European Patent Application No. 17206518.7 dated Feb. 23, 2021, 6 Pages.
Office Communication for U.S. Appl. No. 14/859,114 dated Mar. 8, 2021, 4 Pages.
Office Communication for U.S. Appl. No. 16/004,182 dated Mar. 8, 2021, 60 Pages.
Office Communication for U.S. Appl. No. 17/062,500 dated Mar. 9, 2021, 17 Pages.
Office Communication for U.S. Appl. No. 16/152,277 dated Mar. 18, 2021, 10 Pages.
Office Communication for U.S. Appl. No. 17/160,698 dated Mar. 18, 2021, 11 Pages.
Office Communication for U.S. Appl. No. 17/062,500 dated May 18, 2021, 4 Pages.
Office Communication for U.S. Appl. No. 17/203,371 dated May 20, 2021, 10 Pages.
Office Communication for U.S. Appl. No. 17/115,529 dated May 25, 2021, 18 Pages.
Office Communication for U.S. Appl. No. 14/859,114 dated May 26, 2021, 11 Pages.
Office Communication for U.S. Appl. No. 16/262,756 dated May 27, 2021, 7 Pages.
Office Communication for U.S. Appl. No. 17/114,384 dated May 27, 2021, 13 Pages.
Office Communication for U.S. Appl. No. 17/190,653 dated May 27, 2021, 11 Pages.
Office Communication for U.S. Appl. No. 16/741,567 dated Jun. 8, 2021, 5 Pages.
Office Communication for U.S. Appl. No. 17/203,452 dated Jun. 23, 2021, 11 Pages.
Office Communication for U.S. Appl. No. 16/152,277 dated Jun. 25, 2021, 10 Pages.
Office Communication for U.S. Appl. No. 16/004,182 dated Jul. 1, 2021, 58 Pages.
Office Communication for U.S. Appl. No. 17/160,698 dated Jul. 2, 2021, 12 Pages.
Office Communication for U.S. Appl. No. 17/062,500 dated Jun. 13, 2023, 8 Pages.
Office Communication for U.S. Appl. No. 18/070,705 dated Jun. 20, 2023, 16 Pages.
Office Communication for U.S. Appl. No. 18/070,705 dated Feb. 23, 2023, 14 Pages.
Office Communication for U.S. Appl. No. 17/062,500 dated Feb. 27, 2023, 23 Pages.
Office Communication for U.S. Appl. No. 17/954,640 dated Mar. 15, 2023, 9 Pages.
Office Communication for U.S. Appl. No. 17/864,190 dated Apr. 28, 2023, 5 Pages.

(56) References Cited

OTHER PUBLICATIONS

Office Communication for U.S. Appl. No. 17/973,944 dated May 10, 2023, 9 Pages.
Office Communication for U.S. Appl. No. 17/115,529 dated May 22, 2023, 25 Pages.
Office Communication for U.S. Appl. No. 17/864,190 dated Jan. 24, 2023, 12 Pages.
Office Communication for U.S. Appl. No. 17/588,120 dated Feb. 1, 2023, 15 Pages.
Office Communication for U.S. Appl. No. 17/864,190 dated Sep. 19, 2022, 10 Pages.
Office Communication for U.S. Appl. No. 17/062,500 dated Oct. 5, 2022, 4 Pages.
Office Communication for U.S. Appl. No. 17/203,452 dated Oct. 19, 2022, 9 Pages.
Office Communication for U.S. Appl. No. 17/588,120 dated Oct. 21, 2022, 5 Pages.
Office Communication for U.S. Appl. No. 17/203,452 dated Nov. 9, 2022, 2 Pages.
Office Communication for U.S. Appl. No. 17/588,895 dated Nov. 9, 2022, 11 Pages.
Office Communication for U.S. Appl. No. 17/954,640 dated Nov. 30, 2022, 10 Pages.
Office Communication for U.S. Appl. No. 17/115,529 dated Dec. 9, 2022, 21 Pages.
Office Communication for U.S. Appl. No. 17/484,167 dated May 17, 2022, 3 Pages.
Office Communication for U.S. Appl. No. 17/484,167 dated Jun. 10, 2022, 5 Pages.
Office Communication for U.S. Appl. No. 17/203,452 dated Jun. 22, 2022, 22 Pages.
Office Communication for U.S. Appl. No. 14/595,598 dated Jul. 13, 2022, 9 Pages.
Office Communication for U.S. Appl. No. 17/062,500 dated Jul. 26, 2022, 20 Pages.
Office Communication for U.S. Appl. No. 17/588,120 dated Jul. 27, 2022, 34 Pages.
Office Communication for U.S. Appl. No. 17/190,653 dated Aug. 2, 2022, 8 Pages.
Office Communication for U.S. Appl. No. 17/115,529 dated Aug. 8, 2022, 21 Pages.
Office Communication for U.S. Appl. No. 17/588,895 dated Aug. 12, 2022, 12 Pages.
Office Communication for U.S. Appl. No. 17/203,452 dated Sep. 8, 2022, 4 Pages.
Office Communication for U.S. Appl. No. 17/504,289 dated Mar. 28, 2022, 9 Pages.
Office Communication for U.S. Appl. No. 17/588,120 dated Apr. 11, 2022, 36 Pages.
Office Communication for U.S. Appl. No. 17/588,895 dated Apr. 27, 2022, 6 Pages.
Office Communication for U.S. Appl. No. 17/190,653 dated Apr. 28, 2022, 13 Pages.
Office Communication for U.S. Appl. No. 17/510,043 dated Apr. 29, 2022, 10 Pages.
Office Communication for U.S. Appl. No. 17/115,529 dated Apr. 29, 2022, 4 Pages.
Office Communication for U.S. Appl. No. 17/190,653 dated Dec. 21, 2021, 12 Pages.
Office Communication for U.S. Appl. No. 14/595,598 dated Dec. 29, 2021, 19 Pages.
Office Communication for U.S. Appl. No. 17/062,500 dated Jan. 7, 2022, 4 Pages.
Office Communication for U.S. Appl. No. 16/741,567 dated Jan. 11, 2022, 6 Pages.
Office Communication for U.S. Appl. No. 17/203,452 dated Jan. 14, 2022, 4 Pages.
Office Communication for U.S. Appl. No. 17/510,043 dated Jan. 21, 2022, 13 Pages.
Office Communication for U.S. Appl. No. 16/741,567 dated Feb. 7, 2022, 8 Pages.
Office Communication for U.S. Appl. No. 17/530,420 dated Feb. 10, 2022, 24 Pages.
Office Communication for U.S. Appl. No. 16/004,182 dated Feb. 18, 2022, 11 Pages.
Office Communication for U.S. Appl. No. 17/115,529 dated Feb. 18, 2022, 20 Pages.
Office Communication for U.S. Appl. No. 17/203,452 dated Feb. 24, 2022, 14 Pages.
Office Communication for U.S. Appl. No. 17/484,167 dated Mar. 11, 2022, 11 Pages.
Office Communication for U.S. Appl. No. 17/062,500 dated Mar. 22, 2022, 19 Pages.
Office Communication for U.S. Appl. No. 16/152,277 dated Oct. 18, 2021, 5 Pages.
International Search Report and Written Opinion for International Patent Application No. PCT/US2021/023525 dated Oct. 12, 2021, 6 Pages.
Office Communication for U.S. Appl. No. 17/115,529 dated Oct. 22, 2021, 20 Pages.

\* cited by examiner

| Spoke File ID | Hub File ID |
|---|---|
| 42 | 314 |
| 123 | 654 |
| 789 | 987 |
| 555 | 6543 |
| ... | ... |

*Fig. 8*

SHARING NAMESPACES ACROSS FILE SYSTEM CLUSTERS

TECHNICAL FIELD

The present invention relates generally to file systems, and more particularly, but not exclusively, to sharing namespaces across file system clusters.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth.

Further, more recently organizations are increasingly relying on distributed resources, including distributed/work-from-home employees, geographically distant work centers, geographically distant data centers, and so on. Often these distant/separate resources need to share data. Using a central file system may enable some shared access across far distances, however, in many data intensive work flows relying on distantly located file systems may have various disadvantages, including poor responsiveness, redundant data copying, dependence on unreliable long distance, connectivity, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical schematic of a file identifier map for sharing namespaces across file system clusters in accordance with one or more of the various embodiments;

DETAILED DESCRIPTION OF VARIOUS EMBODIMENTS

Figure 1:
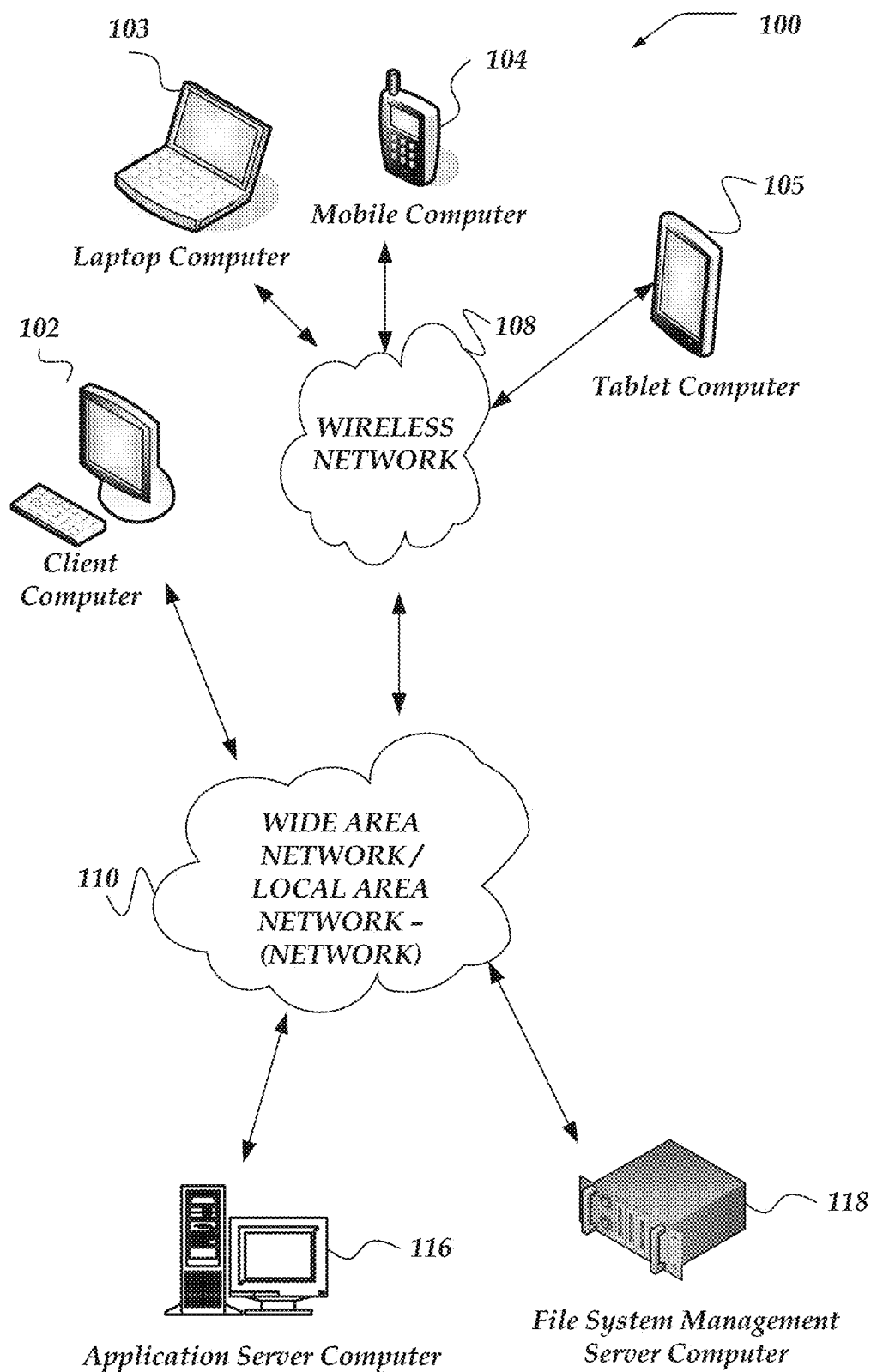
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VB Script, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein the term "hub" refers to a file system that may be sharing one or more portions of the file system with another separate file system.

As used herein the term "spoke" refers to a portion of a file system that provides local access to a portion of a remote file system.

As used herein the term "hub file system" refers to a file system that is configured to share one or more portions of the file system as spokes in a remote file system. Hub file system may refer to entire file system and not just the portions that are shared in a spoke. Note, a file system may be considered a hub file system even though in some cases it may include a spoke from another file system.

As used herein the term "spoke file system" refers to a file system that includes at least one spoke from at least one hub file system. Generally, the spoke file system may be considered to be an entire remote file system rather just the spoke portion that is shared from the hub file system. Spoke file systems may be in a spoke-hub relationship with a remote hub file system. Note, a file system may be considered a spoke file system even though in some cases it may share a spoke with another file system.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to sharing namespaces across file system clusters. In one or more of the various embodiments, a file system item in a spoke file system may be determined based on a command provided to the spoke file system such that the file system item may be associated with an inode mask associated with an inode on a hub file system.

In one or more of the various embodiments, a plurality of data blocks associated with the file system item may be determined based on the command and the inode mask such that the plurality of data blocks may be absent from the spoke file system.

In one or more of the various embodiments, generating one or more requests for one or more leases based on the plurality of absent data blocks such that each of the one or more lease requests correspond to a portion of the plurality of absent data blocks and such that the one or more lease requests are communicated to the hub file system.

In one or more of the various embodiments, employing the one or more leases provided by the hub file system to perform further actions, including: copying each portion of the plurality of absent data blocks from the hub file system to the spoke file system such that each portion of the plurality of absent data blocks may be associated with a lease; updating the inode mask to include the one or more leases and each copied portion of the plurality of absent blocks; employing the copied portions of the plurality of absent blocks to satisfy the command; or the like.

In one or more of the various embodiments, a request may be communicated to the hub file system to establish a spoke-hub relationship between the spoke file system and the hub file system such that the request includes a mount point in the spoke file system for establishing a spoke and a location in the hub file system that shares one or more file system items to the spoke. In one or more of the various embodiments, the spoke in the spoke file system may be established such that the spoke provides shared access in the spoke file system to the one or more file system items shared from the location in the hub file system.

In one or more of the various embodiments, generating the one or more requests for the one or more leases may include: determining an amount of data blocks to associate with each lease based on a time to copy each portion of the absent data blocks from the hub file system to the spoke file system such that the time to copy each portion of the absent data blocks from the hub file system to the spoke file system may be less than a threshold value. In one or more of the various embodiments, one or more data blocks stored in the spoke file system that are associated with a valid lease may be determined based on the inode mask. In some embodiments, the one or more data blocks stored in the spoke file system may be employed to satisfy the command.

In one or more of the various embodiments, the one or more leases may be invalidated based on one or more revocation messages sent by the hub file system such that the inode mask may be updated to indicate the revocation of the one or more leases. In some embodiments, the one or more leases may be reacquired from the hub file system for the spoke file system based on one or more subsequent commands such that the hub file system communicates a current contents of the one or more data blocks that may be associated with the reacquired leases to the spoke file system.

In one or more of the various embodiments, a revocation message from the hub file system may be employed to invalidate one or more leases. In some embodiments, one or more changes to one or more data blocks associated with the one or more leases and stored in the spoke file system may be determined. In some embodiments, information about the one or more changes may be communicated to the hub file system. In some embodiments, the inode mask may be updated to indicate that the one or more leases are invalid.

In one or more of the various embodiments, the inode in the hub file system that corresponds to the inode mask may be determined based on the one or more lease requests. In some embodiments, one or more data blocks stored in the hub file system may be determined based on the inode and the one or more lease requests. In some embodiments, one or more active leases associated with the one or more data blocks may be determined. In some embodiments, the one or more active leases associated with the one or more data blocks may be revoked such that the hub file system communicates a revocation message to one or more other spoke file systems associated with the one or more active leases and such that one or more changes to the one or more data blocks may be copied from the one or more other spoke file systems to the hub file system. In some embodiments, the one or more leases may be generated based on the one or more lease requests. In some embodiments, the one or more leases may be communicated to the spoke file system.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
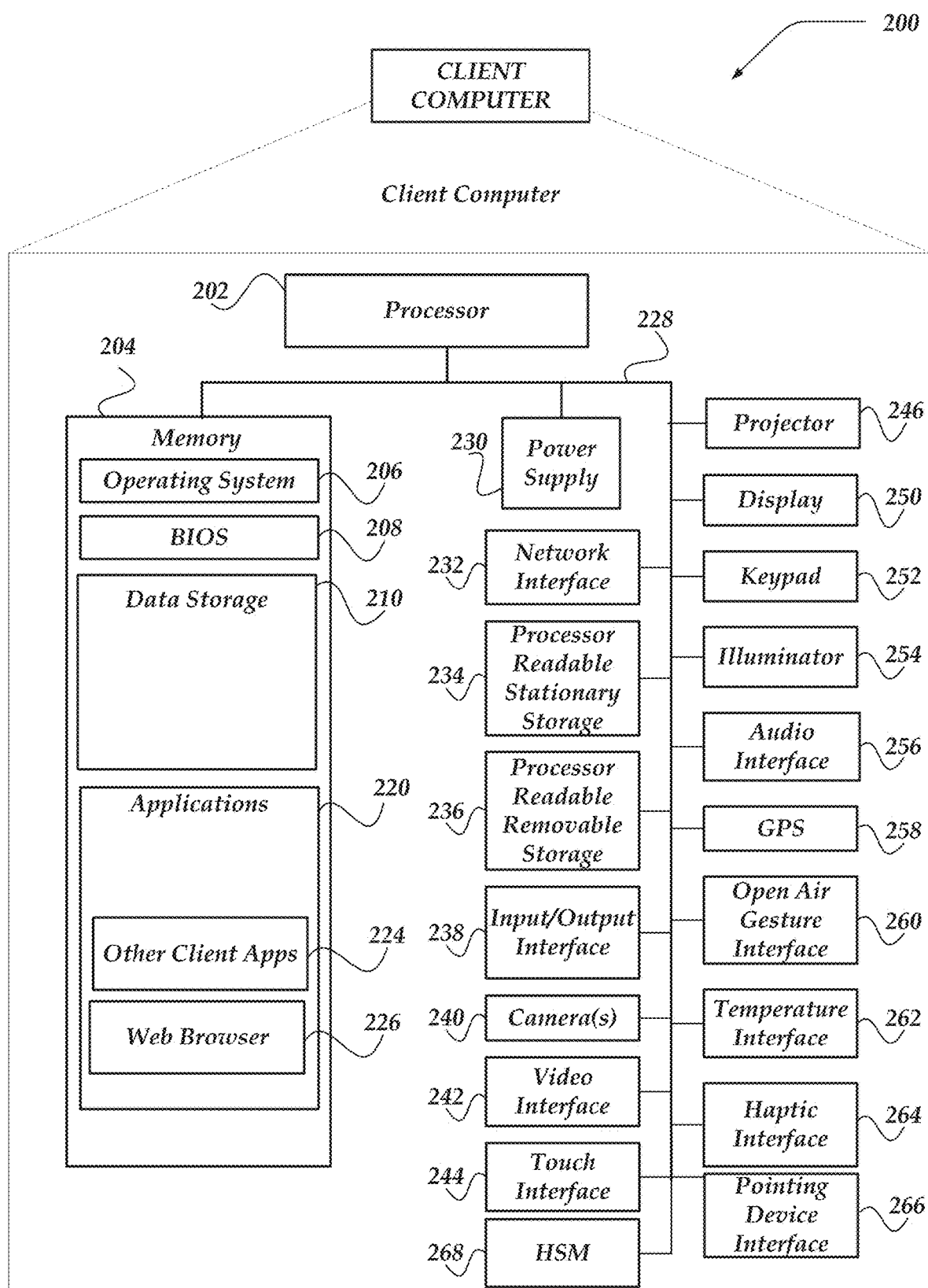
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
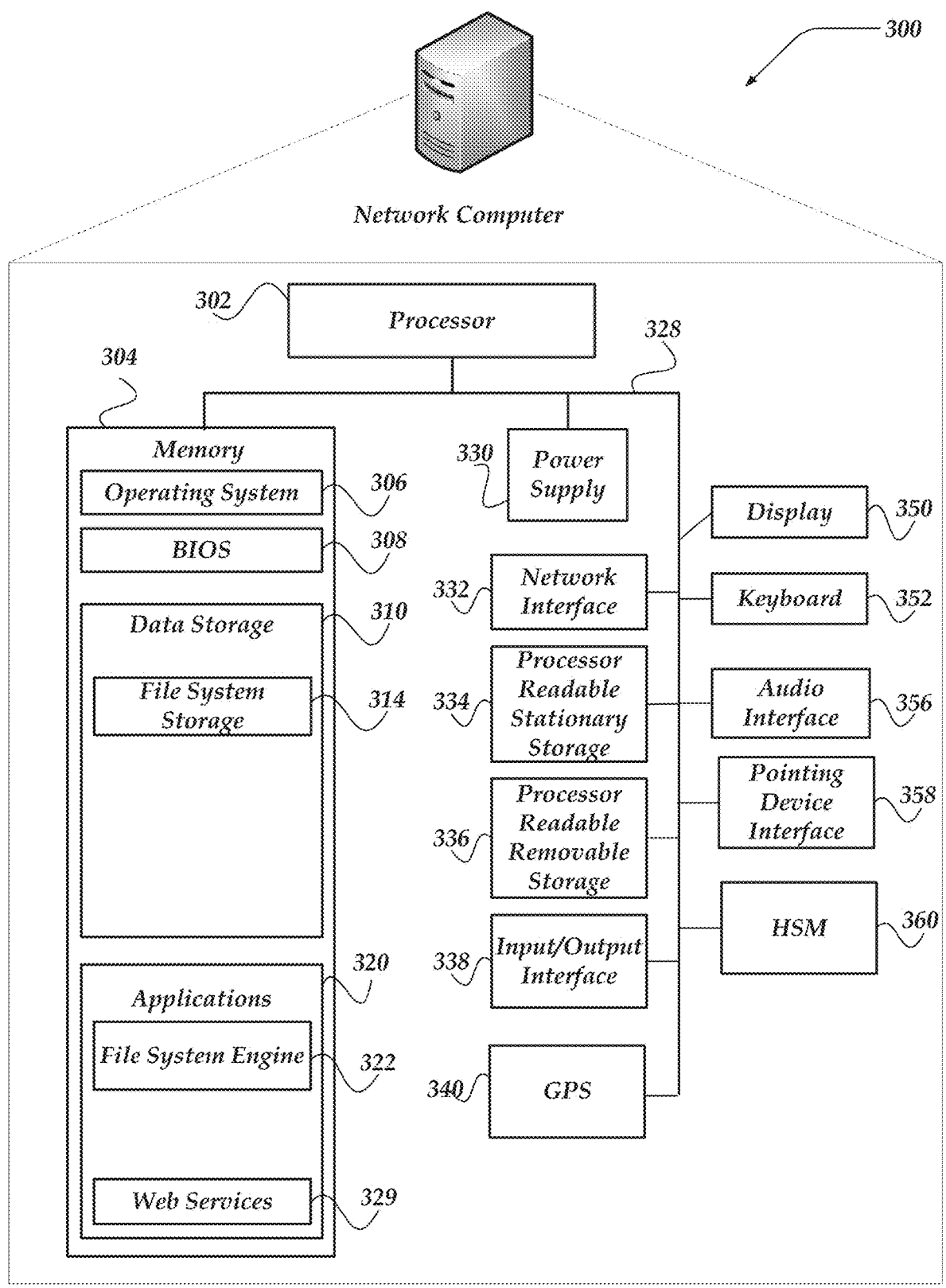
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
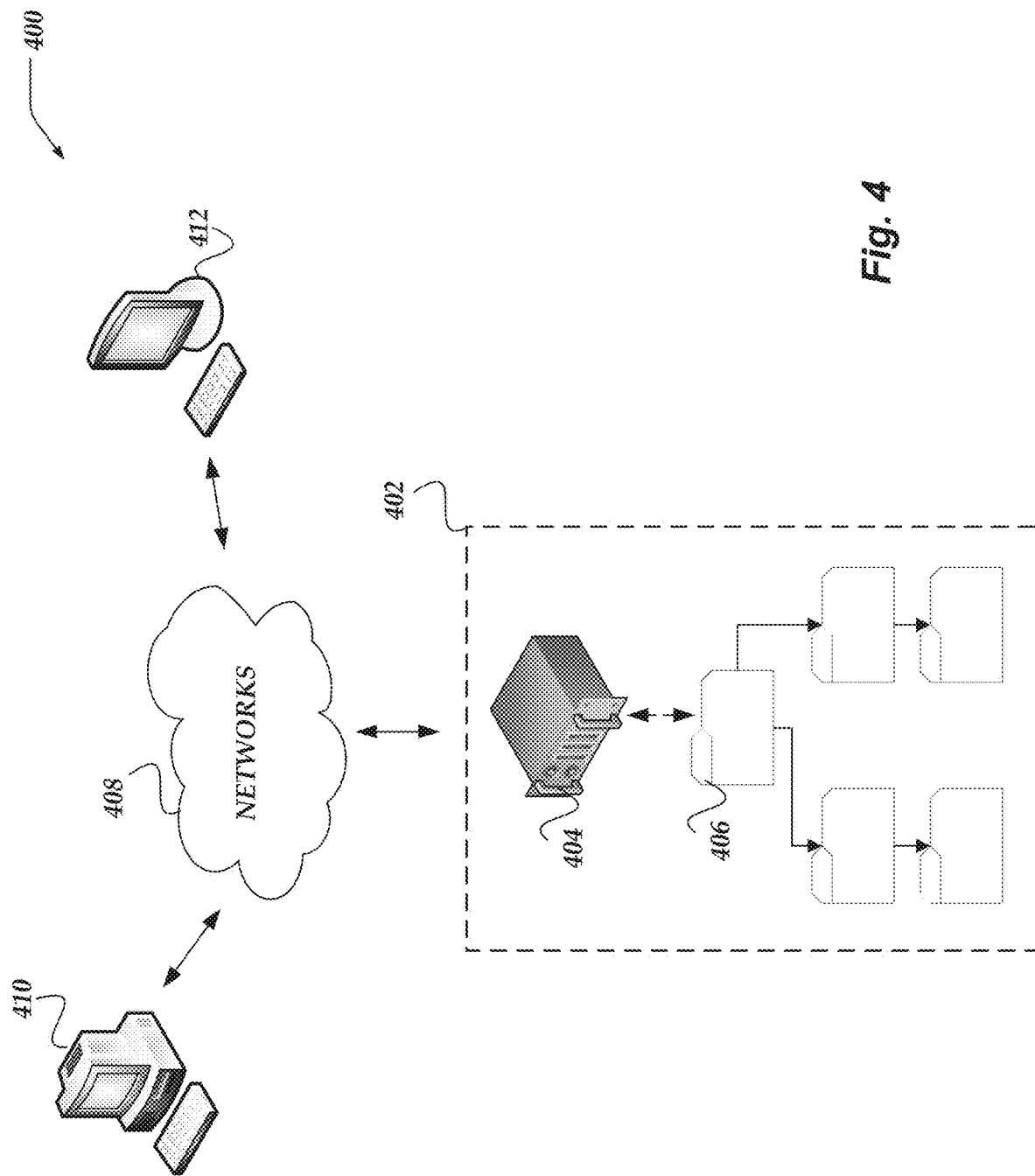
FIG. 4 illustrates a logical architecture of a system for sharing namespaces across file system clusters in accordance with one or more of the various embodiments.

FIG. 4 illustrates a logical architecture of system 400 for sharing namespaces across file system clusters in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include files, documents, directories, folders, backups, snapshots, replication snapshots, replication information, or the like. In some embodiments, some file system items may be comprised of smaller file system items. Accordingly, in some embodiments, blocks or data blocks may be considered to be smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports sharing namespaces across file system clusters because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
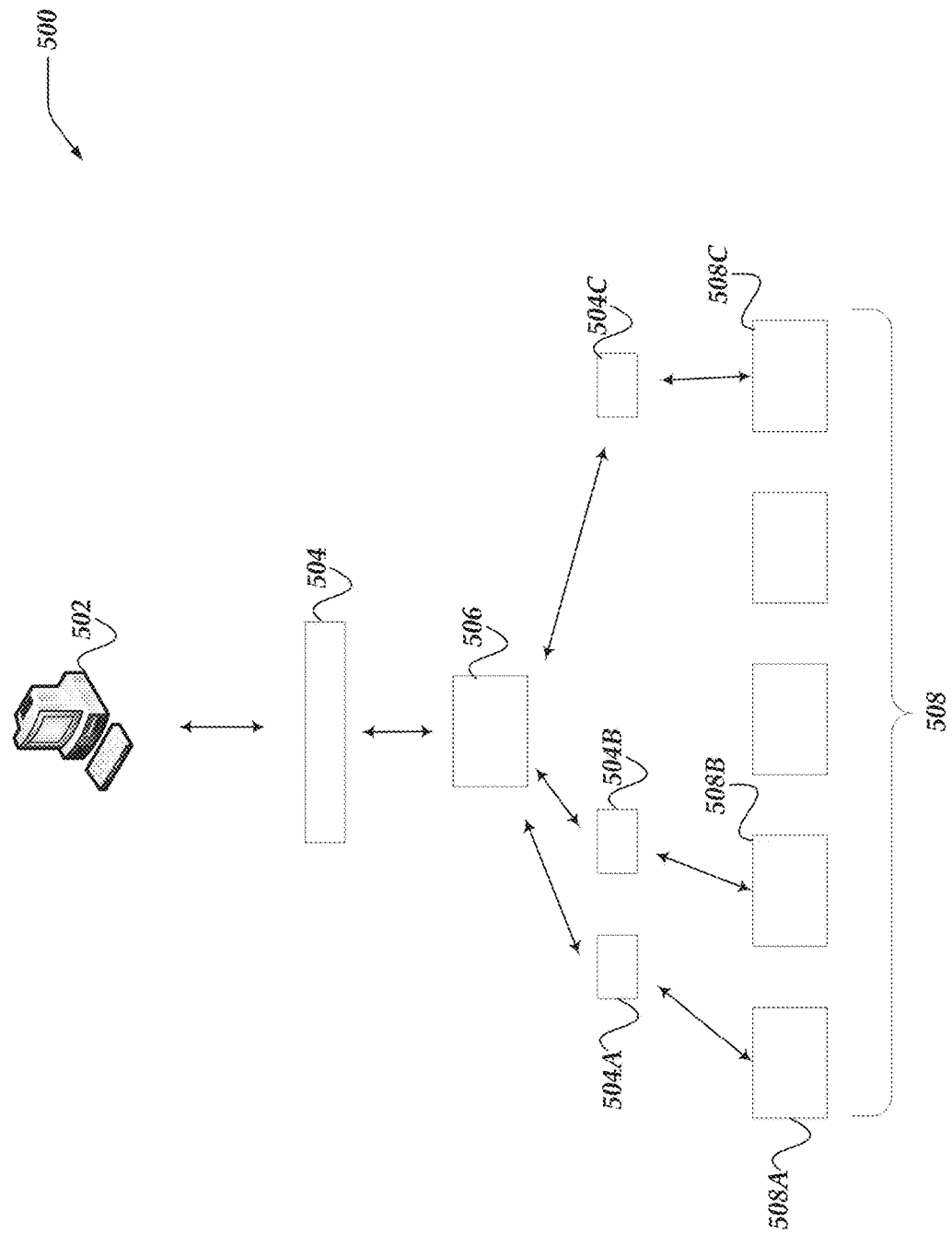
FIG. 5 illustrates a logical schematic of a file system for sharing namespaces across file system clusters in accordance with one or more of the various embodiments.

FIG. 5 illustrates a logical schematic of file system 500 for sharing namespaces across file system clusters in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients may be enabled to issue various file system commands (e.g., read file, remove file, save file, or the like) to a file system engine that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g., files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request is completed successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction was completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
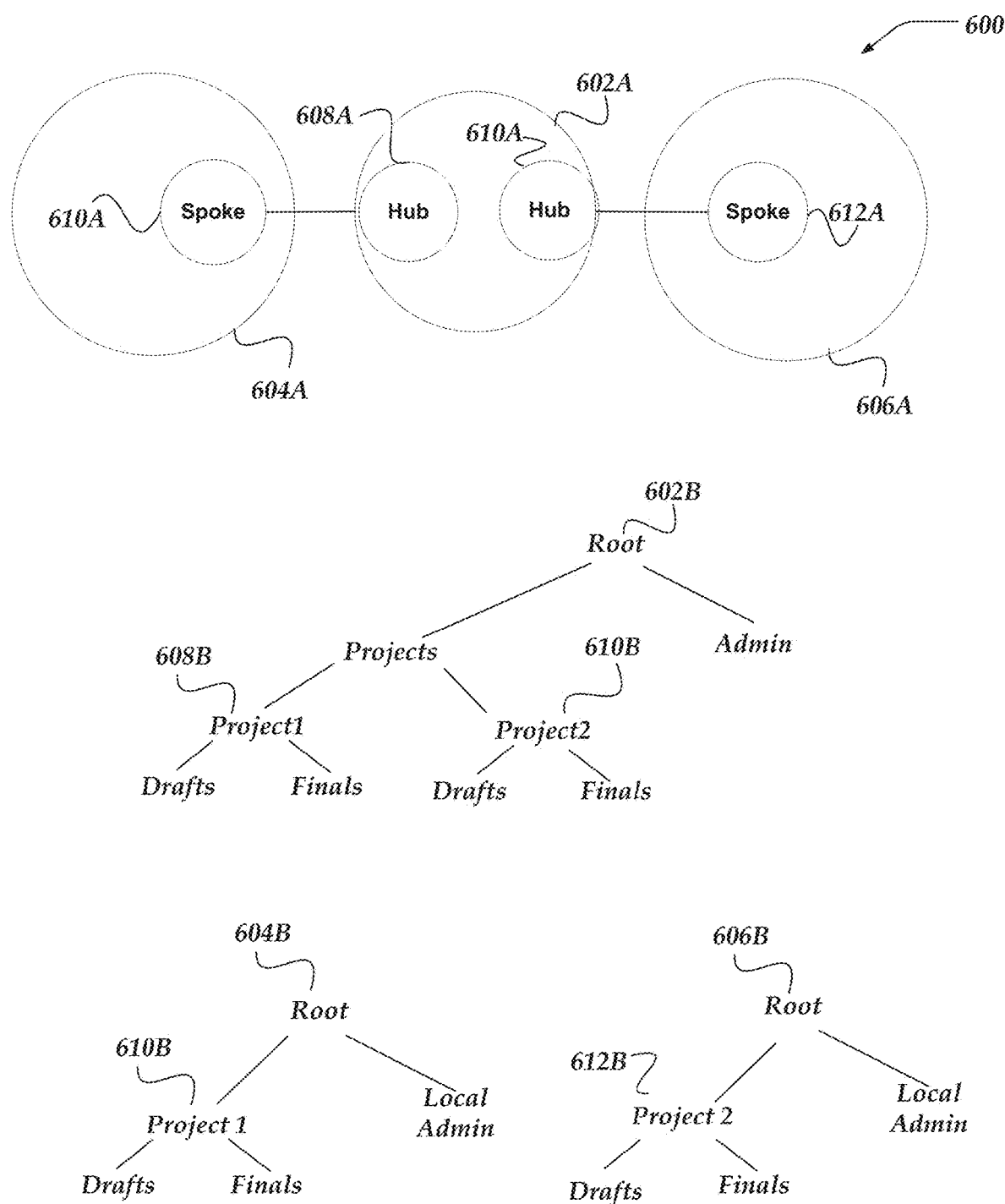
FIG. 6 illustrates a logical schematic of distributed file system for sharing namespaces across file system clusters in accordance with one or more of the various embodiments.

FIG. 6 illustrates a logical schematic of distributed file system 600 for sharing namespaces across file system clusters in accordance with one or more of the various embodiments. File systems are described in more detail in FIG. 4. In some embodiments, two or more separate file systems, such as, file system 602A, file system 604A, file system 606A, or the like, may be configured with hub and spoke relationships. In some embodiments, hub file systems may be configured to allow spoke file systems to access particular portions of the hub file system. In some embodiments, spoke file systems may be remote or otherwise separate from the hub file system. Note, the term spoke file system denotes a file system that includes a spoke relationship with a hub file system. Accordingly, in some embodiments, spoke file system may be considered to include spoke items shared from a hub as well as one or more local file system items. In some embodiments, the particular file system items shared from a hub file system may be referred to as spoke items in a spoke file system. Note, in some embodiments, each separate file system may have its own independent file system engine.

In one or more of the various embodiments, spoke file systems may share one or more portions of the namespace and data with their corresponding hub(s). In one or more of the various embodiments, hub file systems may be configured to share file system items with one or more spoke file systems. Accordingly, in this example, spoke 608A and spoke 610A may each represent file system items shared from hub file system 602A.

In one or more of the various embodiments, spokes may enable file system items from the hub to be accessed by clients as if the shared file system items were stored locally in the spoke file system. In one or more of the various embodiments, each spoke file system may be configured to access the same or different portions of the same hub file system. In this example, for some embodiments, directory 602B may represent the root of hub file system 602A, directory 604B may represent the root directory of file system 604A, and directory 606B may represent the root directory of file system 606A.

In some embodiments, file system engines may be arranged to provide one or more user interfaces that enable file system administrators to establish hub-spoke relationships. In some embodiments, file system administrators that intend to establish a spoke in their local file system may submit a request to the administrator of the file system intended to be the hub for the impending spoke. Accordingly, in some embodiments, upon acknowledgment and approval by the hub file system administrators, file system engines may be arranged to establish the requested hub-spoke relationship. In some embodiments, administrators requesting to create a spoke may declare a local mount point in the spoke file system where file system items shared from hub file system will be located in the spoke file system.

In some embodiments, if a spoke may be established, users may observe and use the file system items included in the spoke as if they were located in their file system. In this example, directory 610B may appear to users of file system 604B as if it is part of the local file system even though it is a spoke from hub file system 602A. Likewise, in this example, directory 612B may appear to users of file system 606B as if it may be local to file system 606A.

In one or more of the various embodiments, file system engines may be arranged to enable the same portion of a hub file system to be shared with two or more spokes. Also, in some embodiments, file system engines may be arranged to enable spokes or portions of spoke file systems to act as hubs that shares portion of a spoke file systems to other file system as a spoke. Thus, in some embodiments, a given file system may be configured to be spoke file system and a hub file system at the same time. In some cases, for some embodiments a spoke file system may be shared some or all items in spoke (e.g., shared to it from another hub) with other file systems. In this case, for some embodiments, the spoke file system may become a hub file system for another spoke file system even though it may be shared file system items from a local spoke with another spoke file system.

For example, a hub may provide file system items for a first spoke and that first spoke may be configured to act as hub for a second spoke. In general, the number of 'chained' spokes may be unbounded. However, in some embodiments, file system policies may be configured to limit the length of hub-spoke-spoke chains. Likewise, in some embodiments, file system policies may be configured to limit or restrict self-referencing spokes, loop configurations, or the like.

Further, in some embodiments, file system engines may be arranged to provide user interfaces that enable administrators to establish file system policies that exclude portions of file systems from sharing file system items for spokes.

In one or more of the various embodiments, if users access file system items via a spoke, file system engines may be arranged to determine which portions of the file system items that user may be accessing and obtain a lease from the hub to enable access to the file system items. In some embodiments, leases may be fine grained such that the 'size' of the lease may be restricted to an amount of data that may be copied from the corresponding hub file system in a given time.

Figure 7:
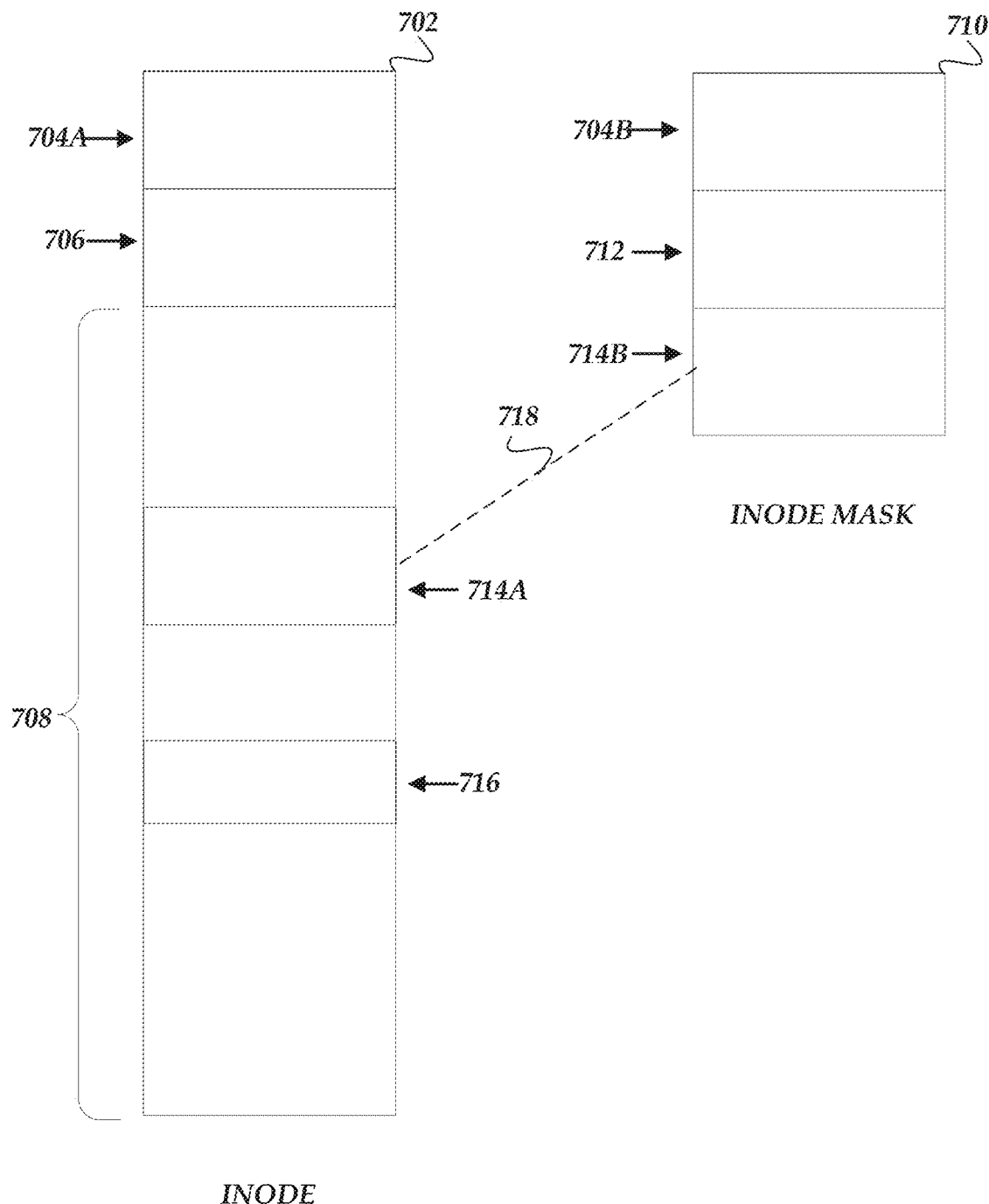
FIG. 7 illustrates a logical schematic of an inode and an inode mask for sharing namespaces across file system clusters in accordance with one or more of the various embodiments.

FIG. 7 illustrates a logical schematic of an inode and an inode mask for sharing namespaces across file system clusters in accordance with one or more of the various embodiments. In some embodiments, file systems may be arranged to use various data structures for representing file system items in the file system. Conventionally, these types of data structures may be referred to as inodes. In most cases, inodes may be data structures that represent file system items. Accordingly, in some embodiments, inodes may include meta-data such as, item type, some or all of the data for the item, pointers to some or all of actual contents, item location information, permission information or references thereto, size information, last access times, item creation time, ownership, parent/child relation information, lock information, cache status, or the like. Note, the particular fields or their arrangement in inodes may vary depending on the implementation details of a given file system. Also, in some embodiments, a given file system may employ different inode configurations within the same file system for different file system items types or various file system features. For example, in some embodiments, directory inodes may be configured to employ particular data structures for identifying or tracking which file system items may be in a given directory. For example, in some embodiments, a portion of a directory inode may include maps or tables that associates other (child) file system items with a given directory item.

Further, in some embodiments, file systems may adapt or modify inodes depending on the type of deployment or other local requirements. Accordingly, for brevity and clarity, specific inode fields or data representations of fields are omitted here. However, inodes as presented here are at least sufficient for one of ordinary skill in the art to practice the innovations disclosed herein.

In some embodiments, file system engine may be arranged to employ inodes, such as inode 702 for representing file system items that are stored in non-spoke portions of a file system, including hub file systems. In some embodiments, inode 702 may represent entire file system items as they exist in a file system.

Accordingly, in some embodiments, as mentioned, inodes such as, inode 702 may include, various meta-data fields, such as, meta-data fields 704A, meta-data fields 706, or the like, that file system engines may employ for storing information about a file system item. Also, in some embodiments, inodes may be arranged to include references or pointers to the file system data blocks that make up the actual contents of a file system item. For example, if a file system item is comprised of 50000 data blocks, data location fields 708 may include references where in the file system those data block may be located. Generally, one of ordinary skill in the art will appreciate that data locations may be represented using various methods, including ranges, offset values and run lengths, variable length representation of address values, or other optimizations for storage size or indexing/access performance. For example, each value in data location fields may reference where one or more data blocks may be stored in the file system.

In some embodiments, if a hub and spoke relationship may be established, hub file systems may maintain the inodes for file system items shared from the hub file system. However, in some embodiments, spoke file systems may be arranged to represent the file system items shared by the hub using inode masks rather inodes. In some embodiments, inode masks may be data structures that enable file system engines to provide access to file system items in spoke file systems. In some embodiments, inode masks, such as inode mask 710 may be used similarly as inodes, except that they may be arranged to have a smaller memory footprint than full inodes.

Accordingly, in some embodiments, inode mask 710 may comprise meta-data fields 704B, meta-data fields 712, and one or more data location fields, such as, data location field 714B. In some embodiments, because inodes and inode mask represent the same file system item they may share some meta-data fields. In this example, for some embodiments, meta-data fields 704A and meta-data fields 704B may represent field values that have the same value. For example, a meta-data field such as, creation date may have same value in an inode and its corresponding inode mask.

In some embodiments, file system engines may be arranged to employ inode masks on spoke file system to reduce the amount of data that has to be duplicated or otherwise cached between hub file system and spoke file system. Accordingly, in some embodiments, inode masks may be arranged to include references to the file system data blocks that a client of spoke may be using rather than including references to all of the blocks for the file system items corresponding to inode masks. In some embodiments, the data blocks included in an inode mask may be considered data blocks located on the spoke file system. In some cases, for some embodiments, these data blocks will be coped from the hub file system on-demand to service spoke file system client requests. Also, in some embodiments, data blocks associated with inode masks may be 'new' data blocks that have been written by client of the spoke file system. (These may be pushed back to the hub file system as needed.)

In some embodiments, file system engines may be arranged to request data blocks for inode masks as clients need them. In some embodiments, file system engines may be arranged to request a lease on the data blocks actually being used by spoke clients. In some embodiments, leases may be considered to be perpetual locks on a range of data blocks that may be requested on behalf of a spoke client. In this example, for some embodiments, dashed line 718 may be considered to represent a lease of data blocks of a file system item in a hub file system that enables a spoke client to access them via the spoke file system. Accordingly, in some embodiments, data blocks 714A and data blocks 714B represent the data blocks that may be leased to inode mask 710. Thus, in some embodiments, inode mask 710 may enable clients to access the data blocks they are interested in without requiring the entire inode to be copied to the spoke file system. Further, in this example, for some embodiments, data blocks 716 represent another range of data blocks of inode 702 that may be leased to another spoke file system.

In some embodiments, inodes may be arranged to include information for tracking which data blocks have been leased out. Likewise, in some embodiments, inode masks may be arranged to include information tracking the state of their leases to data blocks. Further, in some embodiments, inode or inode masks may include information that indicates if and when leased data blocks have been modified with respect to lease holders or lease grantors.

Also, in some embodiments, file system engines may be arranged to generally treat file system items represented by inode masks similar to how it treats file system items represented by inodes. For example, in common with conventional file systems, hub file systems or spoke file systems may associate file identifiers (file IDs) with file system items. In some embodiments, file system engines may be arranged to generate file IDs for each file (e.g., file system item) that may be unique within a file system. Accordingly, in some embodiments, inodes may be arranged to include a field for storing a file IDs. In some embodiments, file IDs enable file system engines to uniquely identify file system items within a file system. Also, in some embodiments, because file system engines may be arranged to treat spoke file system items the same as local file system items, inode masks may be arranged to store a file ID that may be unique within the spoke file system. Recalling that hub file systems and spoke file systems may be separate file systems, file system engines may be arranged to employ one or more data structures for mapping hub file system file IDs to spoke file system file IDs. Accordingly, in some embodiments, file system engines may be arranged to be relieved from synchronizing file IDs across otherwise independent file systems. (See, FIG. 8.)

Moreover, in some embodiments, inode data location fields represent all of the content of a file system item. Accordingly, in some embodiments, data blocks referenced in an inode, such as, inode 702 may be considered to be stored in the file system that has the inode—the hub file system. In contrast, in some embodiments, the data locations in inode masks may be considered to be portions of the content that the spoke file system has copied from the hub file system as part of being issued a lease. Accordingly, in some embodiments, very large files may effectively be shared to a spoke file system without a general requirement of copying the entire file to the spoke file system.

Figure 8:
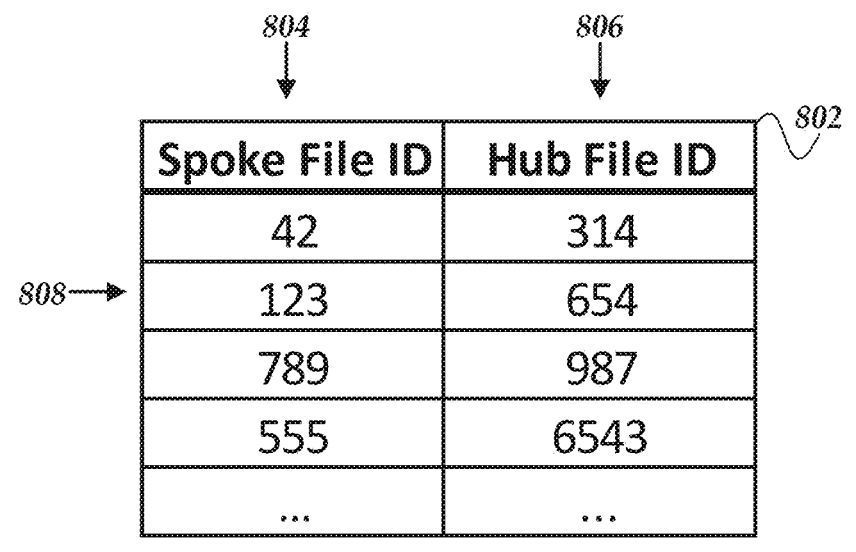

FIG. 8 illustrates a logical schematic of file identifier map 802 for sharing namespaces across file system clusters in accordance with one or more of the various embodiments. As mentioned above, in some embodiments, file systems may use file IDs for identifying file system items. Accordingly, in some embodiments, inodes may be arranged to include a field for storing file IDs. Typically, file IDs may be integers that may be unique within a particular file system. Accordingly, in some embodiments, clients, file system engines, or the like, may be enabled to reference file system items using file IDs. However, in the case of file system items shared to a spoke file system, file ID values generated in the hub file system may be invalid in the spoke file system. Accordingly, rather than attempting to synchronize file IDs across independent file systems, spoke file system engines may be arranged to generate file IDs on the spoke file system and associate them with the corresponding hub file system file IDs (if any).

Accordingly, in some embodiments, file system engines may be arranged to employ a file identifier map data structure, such as table 802 for mapping hub file system file IDs to spoke file system file IDs. In some embodiments, such data structures may be arranged to include a column, such as column 804 for the spoke file system file ID and another column, such as column 806 for the corresponding hub file system file ID. Thus, for example, for some embodiments, if file system engines may be requesting a lease of data blocks of a shared spoke file system item with the local/spoke file ID of 123 in row 808, the hub file system may respond with lease to the requested data blocks for the file system item it has assigned a file ID of 654. Likewise, in some embodiments, if a hub file system may be revoking a lease to the file system item corresponding to hub file system file ID 654, the spoke file system may be enabled to determine the correct inode mask to update based on its spoke file system file ID of 123.

Note, for brevity and clarity file ID map 802 is illustrated using a table. However, one of ordinary skill in the art will appreciate that file ID mapping data structures are not limited using tables or table-like data structures. Further, one of ordinary skill in the art will appreciate that the number of fields/attributes for a file ID map table may vary without departing from the scope of these disclosed innovations.

Figure 9:
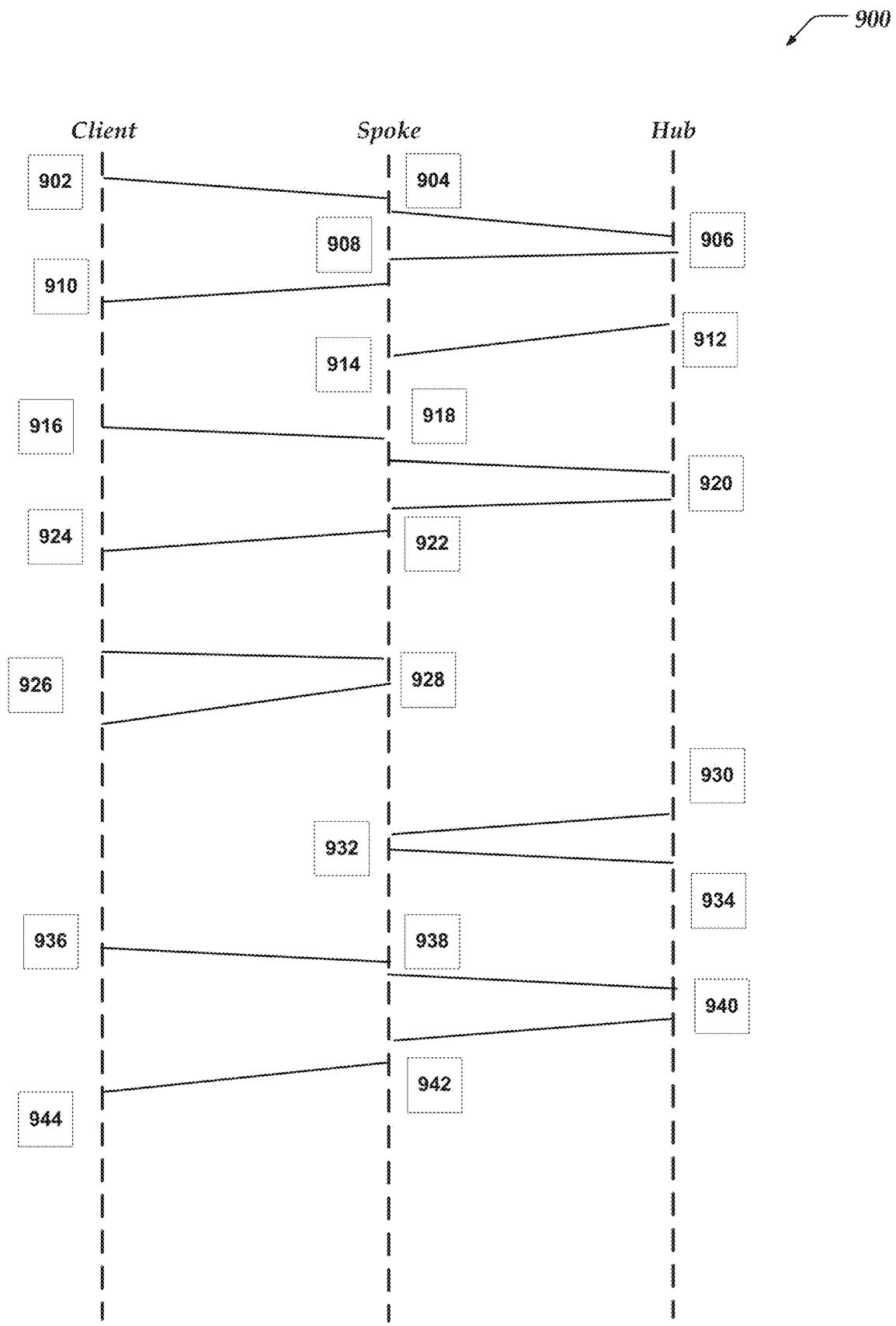
FIG. 9 illustrates a sequence for a read request in a spoke for sharing namespaces across file system clusters in accordance with one or more of the various embodiments.

FIG. 9 illustrates sequence 900 for a read request in a spoke for sharing namespaces across file system clusters in accordance with one or more of the various embodiments. In this example, for some embodiments, sequence 900 illustrates how a hub-spoke relationship may be established between two file systems. Further, in this example, sequence 900 shows how leases may be granted or revoked for a client read request.

At step 902, in some embodiments, a client of a file system may provide a request to its file system engine to establish a spoke file system with a different file system (the hub file system). Note, in some embodiments, initial requests to establish spoke-hub relationships may be provided via an administrator user-interface (including command-line interfaces) that enable spoke file system administrators to provide the relationship request. Also, in some embodiments, spoke file system engines may provide the user interfaces that enable file system administrators to request that a spoke-hub relationship be established.

At step 904, in some embodiments, the file system engine of the client's file system (the spoke file system) may prepare a request to establish a spoke and send it to the file system engine of the putative hub file system. In some embodiments, spoke file system engines may be arranged to provide a user-interface to enable spoke-hub relationships to be requested. Alternatively, in some embodiments, a client computer may be provided an administrative application, or the like, that enables a user of the client computer to submit a relationship request to establish a spoke-hub relationship.

At step 906, in some embodiments, a file system engine of the putative hub file system may be arranged to validate the request. In some embodiments, the putative spoke file system may provide security credentials, cryptographic certificates, or the like, to establish trust with the putative hub file system. In some embodiments, the authentication process may include one or more round-trip 'handshake' messages depending on the particular type of security protocols being employed.

At step 908, in some embodiments, if the request to establish a spoke file system may be authenticated by the hub file system, the file system engine of the spoke file system may provide an acknowledgment message to the requesting administrator. Note, in some cases, the request may have been generated from a user-interface provided by the spoke file system engine such that explicit acknowledgements may not be provided to a client application. Alternatively, in some embodiments, if an administrator employed an administrative application on a client computer, the spoke file system engine may be configured to send an acknowledgement to the client computer via the administrative application.

At step 910, in some embodiments, optionally, the client that initialized the request to establish a spoke file system may receive an acknowledgment that their request to establish a spoke-hub relationship has been authenticated. Note, in some embodiments, at this stage, the client and spoke file system may be considered to be authenticated or validated by the hub file system. However, the spoke with actual shared file system items may be unavailable until the request has been manually approved by an administrator of the hub file system.

At step 912, in some embodiments, an administrator of the hub file system may approve the request to create a spoke file system. For example, in some embodiments, file system engines may be arranged to provide one or more user interfaces that enable file system administrators to view pending spoke requests and accept or deny some or all pending spoke requests.

At step 914, in some embodiments, the file system engine of the spoke file system may enable the spoke file system to create a spoke for accessing files shared from the hub at the requested mount point.

Note, in some embodiments, this may include creating an initial inode mask for the root directory of the spoke. For example, if a user requests a spoke be shared from a hub, the request may include a directory in the hub file system that may be considered the root of the spoke. Also, in some embodiments, the request to establish a spoke may include a mount point/location in the spoke file system where the spoke should be attached to the spoke file system.

Accordingly, in some embodiments, file system engines may be arranged to generate an inode mask for the top level directory located in the spoke file system for the spoke. Note, in some embodiments, since, in this example, the client has not requested to read data from the spoke, so the spoke root inode mask may not be associated with any leases.

At step 916. in some embodiments, the client may attempt to access file system items shared in the spoke. Accordingly, in some embodiments, the client may issue a conventional file system command, such as, read file, open file, list directory, create file, or the like, as normal. In this example, a read command may be assumed.

At step 918, in some embodiments, the spoke file system engine may be arranged to determine if the client file system read command may be associated with one or more file system items in the spoke.

Accordingly, in some embodiments, the file system engine may be arranged to examine the inode mask(s) that may be associated with the file system command. In this example, it may be assumed that this is a first attempt to access the shared file system item in the spoke.

Accordingly, in some embodiments, the spoke file system engine may be arranged to generate a lease request to provide to the hub file system. In some embodiments, leases may be determined in terms of data blocks that represent a portion of the contents of file system items rather than for complete file system items.

In some embodiments, the number of data blocks included in the lease request may be limited based on a file system policy. For example, in some embodiments, file system engines may be configured to restrict the number of data blocks that may be associated with a single lease such that the data associated with those data blocks may be copied from the hub to the spoke within a bounded time limit. Accordingly, in some embodiments, spoke-hub relationships may enable file sharing without unnecessary copying of data blocks across the file systems. For example, if a client may issue a file system 'open' an entire shared file for reading, leases may be granted on-demand for the portions of the file that the client is actually reading not the entire file.

At step 920, in some embodiments, the hub file system engine may be arranged to determine the local inode in the hub file system that will lease data to the spoke. Accordingly, in some embodiments, the hub file system engine may be arranged to check if the data blocks requested by the spoke client may be within another previously issued lease. In some embodiments, if there are no contending leases, the hub file system engine may return a message granting the lease. In some embodiments, the hub file system engine may be arranged to record the lease in the inode of the file system item corresponding to the lease request. Note, in some embodiments, there may be more than one read lease on the same data blocks.

Also, in some embodiments, if the spoke file system needs the data blocks associated with the lease, the hub file system may send copies of those data blocks to the spoke file system when issuing the read lease.

At step, 922, in some embodiments, the spoke file system engine may be arranged to examine the lease granted message and take the appropriate actions.

In some embodiments, if a corresponding inode mask may be absent, the spoke file system engine may be arranged to generate the inode mask for the requested data blocks.

Also, in some embodiments, if a new inode mask may be generated, the spoke file system engine may be arranged to generate a local file ID and associate it with the corresponding file ID from the hub file system.

In some embodiments, the spoke file system engine may be arranged to determine values for the local meta-data that may be included in the created inode mask.

In some embodiments, if the inode mask may be available, the spoke file system engine may be arranged to add the leased data blocks and record the status of the lease in the inode mask.

In some embodiments, if the inode mask may be created and configured, the leased data blocks may be returned the client as part of a larger file-system wide transaction.

Note, in some embodiments, data blocks provided to satfiy a lease may be copied from the hub file system to the spoke file system such that the spoke file system may allocate local storage space to store them as it would with any locally generated data blocks. Accordingly, in some embodiments, data protection, data distribution, mirroring, caching, or the like, of the leased data blocks may occur as usual according to the file system policies.

At step 924, in some embodiments, assuming the client's command transaction completes, the requested data blocks may be provided from the spoke file system.

At step 926, in some embodiments, the client may make additional requests for the leased data blocks as part of its normal operations.

At step 928, in some embodiments, if there may be a valid lease for the requested data blocks, the spoke file system engine may be arranged to return the requested data blocks to the client. Accordingly, in some embodiments, spoke file system engines may be arranged to check the appropriate inode mask to confirm the existence of a valid lease for the requested data blocks.

As mentioned, in some embodiments, lease may be perpetual such that they may remain valid until explicitly revoked by the hub file system.

At step 930, in some embodiments, hub file system engines may be arranged to revoke existing leases as needed. For example, in some embodiments, multiple read leases may be granted for the same sets of data blocks. However, in some embodiments, if a client is requesting a write lease, any other granted leases, including read leases may be revoked before requested write leases may be granted.

Accordingly, in this example, the hub file system engine may receive a request for a write lease. Accordingly, in some embodiments, if the hub file system engine determines that the lease granted at step 920 may be contending with the requested write lease, the hub file system engine may revoke the read lease.

At step 932, in some embodiments, the spoke file system may receive lease revoke request. Accordingly, in some embodiments, the hub file system engine marks its read lease as invalid.

At step 934, in some embodiments, the hub file system engine may receive the acknowledgment that the read lease was invalidated.

At step 936, in some embodiments, the client may attempt to read the same data again resulting in a read request being sent to the spoke file system engine.

At step 938, in some embodiments, the spoke file system engine may determine that the applicable read lease was revoked. Accordingly, in some embodiments, the spoke file system engine may generate another read lease request that indicates which data blocks may be needed. Also, in some embodiments, the lease request may include a time value of when the last valid lease was acquired.

At step 940, in some embodiments, the hub file system engine may be arranged to determine if the read lease may be granted. If it may be granted the hub file system engine may grant the lease and determine if there have been any changes to the requested data blocks since the last time the read lease was granted. In some embodiments, if there may be changes, the hub file system engine may include those changes with the lease grant message.

At step 942, in some embodiments, if the new read lease may be granted, the spoke file system engine may update the appropriate inode mask. If the data has changed since the last time the lease was acquired, the hub file system engine may be arranged to update its local copies to reflect the changes.

At step 944, in some embodiments, the client may be provided the data that they requested.

Figure 10:
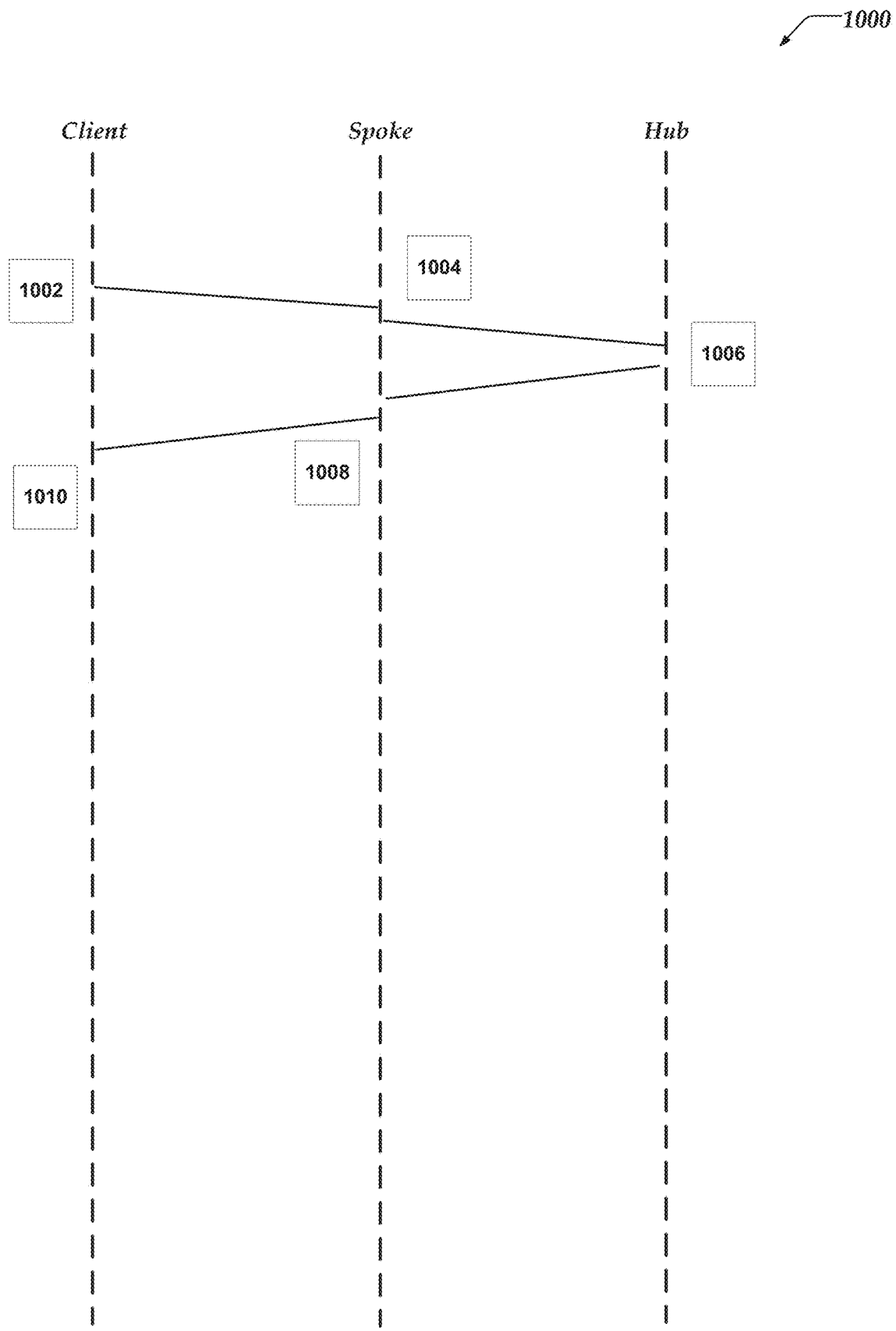
FIG. 10 illustrates a sequence for a write request in a spoke for sharing namespaces across file system clusters in accordance with one or more of the various embodiments.

FIG. 10 illustrates sequence 1000 for a write request in a spoke for sharing namespaces across file system clusters in accordance with one or more of the various embodiments. In this example, for some embodiments, sequence 1000 illustrates how a write request directed to a file system item shared in a spoke may be processed. Note, in some cases, for some embodiments, some of these steps may be similar to some of the steps described above for sequence 900. Accordingly, for brevity, redundant descriptions may be omitted here. Accordingly, in this example, it may be assumed that a spoke-hub relationship has been established.

At step 1002, in some embodiments, a client using the spoke file system may generate a write command to write some data to a file system item shared in spoke.

At step 1004, in some embodiments, the file system engine for the spoke file system may receive the write command. Accordingly, in some embodiments, the file system engine may lookup the inode mask for the target of the write request.

Accordingly, in some embodiments, the file system engine may examine the inode mask to determine if the spoke has an active write lease on the portion of the file system item that the client may be attempting to write into.

In some embodiments, if a valid lease may be absent, the spoke file system engine may be arranged to request a write lease from the hub. Accordingly, in some embodiments, spoke file system engines may generate a write lease request for a number of data blocks. Note, the write lease (like read leases) may be limited in size to ensure that the associated data blocks may be provided to the client within a bounded time. For example, in some embodiments, individual write leases may be limited to 8 MiB, or the like, even the client's write command may be directed to more than data than the write lease limit. (In this case, subsequent leases may be granted for the same file system command, each directed to a portion of the file system item and sized to stay within the size limit.)

At step 1006, in some embodiments, the hub file system engine may receive the request for a write lease. Accordingly, in some embodiments, the hub file system engine may examine the inode that corresponds write lease to check if another lease may be active for the same data blocks.

In some embodiments, if there may be no active leases, the hub file system engine may generate a write lease.

In some embodiments, if there may be an active read lease of the data blocks of interest, the hub file system engine may be arranged to revoke the read lease. Note, these revoked leases may be for other clients working in the hub file system, or one or more spoke file systems. Also, in some embodiments, the requesting client may be holding a read lease that may be revoked.

In some embodiments, if there may be write lease active on the data blocks of interest, the hub file system engine may confirm that associated writes that may be outstanding may be completed and that if data may be located in remote spoke file systems it may be pulled into the hub file system to ensure the data on the hub file system is current.

For example, in some embodiments, if another spoke file system has a write lease that is being revoked, that spoke file system engine may determine if there may be changes made under its lease that have not yet been sent to the hub file system. If so, that spoke file system may send the updated data to the hub file system with its acknowledgment that its lease has been revoked.

Accordingly, in some embodiments, if the hub file system engine confirms that the requested data may be current, it may grant the write lease to the spoke file system. In some embodiments, if the data in the hub file system under the new write lease may not be current on the spoke file system, the hub file system may provide the appropriate updates to the spoke file system.

At step 1008, in some embodiments, if the write lease may be obtained, the spoke file system engines may execute one or more write requests on the data blocks that may be under the write lease sending the appropriate acknowledgments to the client.

At step 1010, in some embodiments, the client may receive acknowledgments that the write command may be completed.

Generalized Operations

FIGS. 11-15 represent generalized operations for sharing namespaces across file system clusters in accordance with one or more of the various embodiments. In one or more of the various embodiments, processes 1100, 1200, 1300, 1400, or 1500 described in conjunction with FIGS. 11-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 11-15 may perform actions for sharing namespaces across file system clusters in accordance with at least one of the various embodiments or architectures such as those described in conjunction with FIGS. 1-10. Further, in one or more of the various embodiments, some or all of the actions performed by processes 1100, 1200, 1300, 1400, or 1500 may be executed in part by one or more of file system engine 322, or the like.

Figure 11:
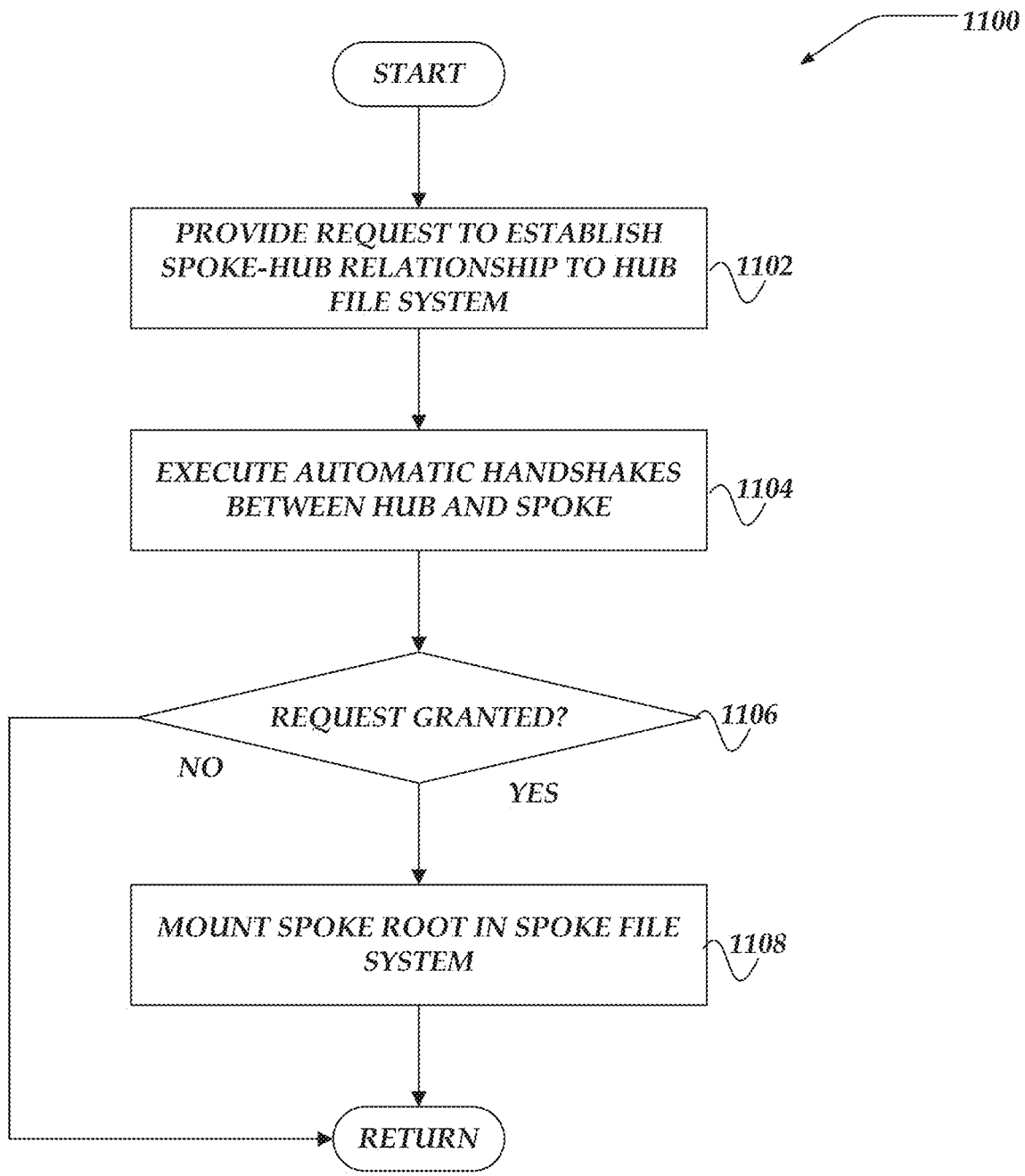
FIG. 11 illustrates an overview flowchart for a process for sharing namespaces across file system clusters in accordance with one or more of the various embodiments.

FIG. 11 illustrates an overview flowchart for process 1100 for sharing namespaces across file system clusters in accordance with one or more of the various embodiments. After a start flowchart block, at flowchart block 1102, in one or more of the various embodiments, requests to establish a spoke-hub relationship may be provided to a hub file system.

In some embodiments, file system engines may be arranged to provide user interfaces that enable file system administrators to submit requests to establish a spoke-hub relationship. Typically, in some embodiments, administrator of a putative spoke file system may submit a request to establish the spoke-hub relationships to a file system engine of the hub file system. In some embodiments, relationships requests may include security credential information, a local directory where the spoke may be mounted, a remote directory that may be the root directory of requested spoke.

At flowchart block 1104, in one or more of the various embodiments, file system engines may be arranged to one or more handshake messages between the spoke file system engine and the hub file system engine to established to authenticate the spoke file system with the hub file system. In some embodiments, file system engines may be arranged to execute one or more cryptographic/security protocols to authenticate the spoke-hub relationship request. This may include two or more handshake messages to share secrets, exchange cryptographic security certificates, obtain passphrases, or the like, depending on the particular protocol being used.

At flowchart decision block 1106, in some embodiments, if the request to establish a spoke-hub relationship may be granted, control may flow to flowchart block 1108; otherwise, control may be returned to a calling process. In some embodiments, if administrators of a putative spoke file system have been authenticated and the relationship request validated, the request may be placed into a queue. Accordingly, in some embodiments, file system engines may be arranged to provide user interfaces that enable administrators of putative hub file systems to review spoke requests, accept/approve spoke requests, or deny spoke requests.

At flowchart block 1108, in some embodiments, spoke file system engines may be arranged to mount the spoke in the spoke file system at the location that was indicated in the request to establish the spoke-hub relationship.

Next, in one or more of the various embodiments, control may be returned to a calling process.

Figure 12:
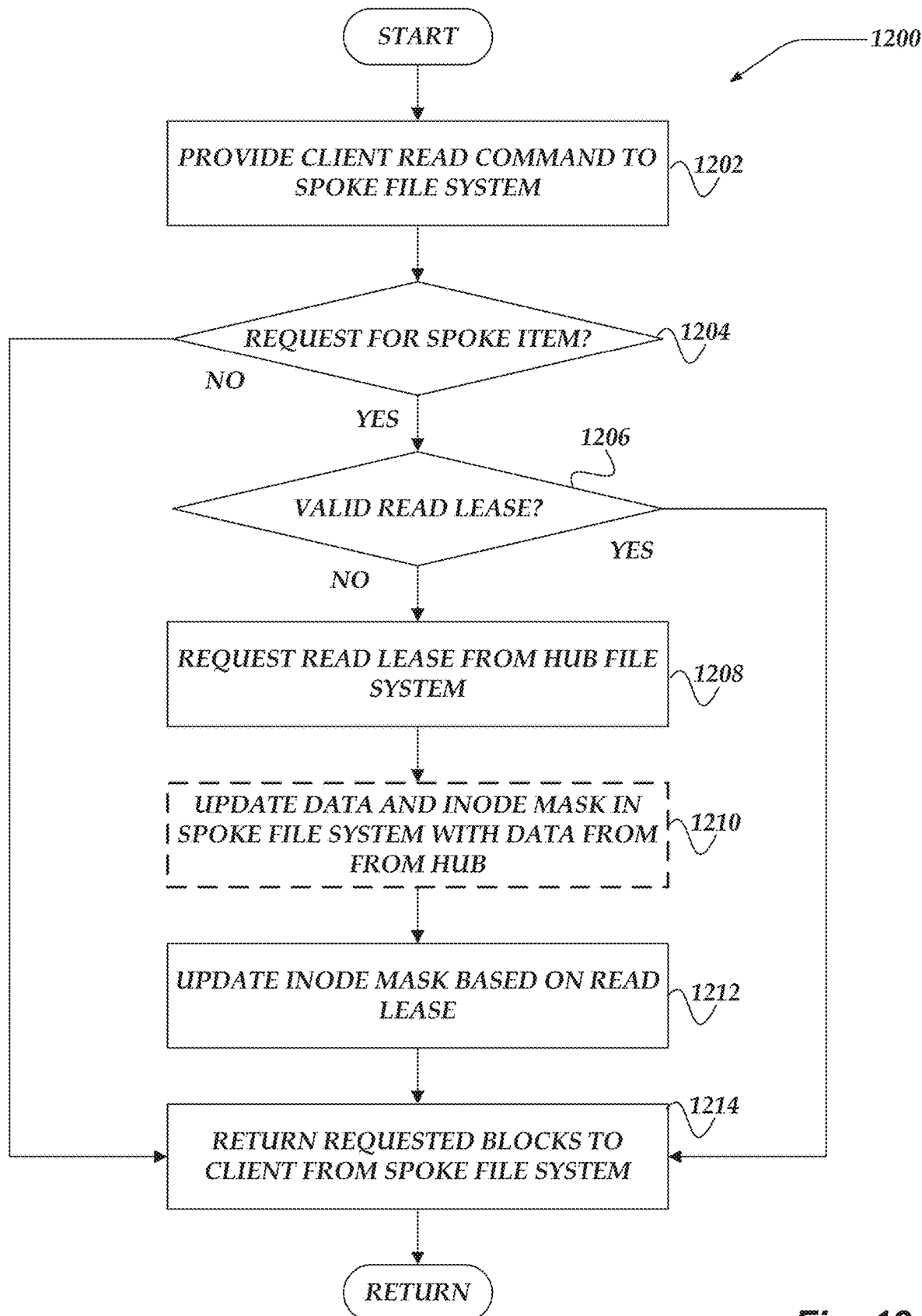
FIG. 12 illustrates a flowchart for a process for sharing namespaces across file system clusters in accordance with one or more of the various embodiments.

FIG. 12 illustrates a flowchart for process 1200 for sharing namespaces across file system clusters in accordance with one or more of the various embodiments. After a start flowchart block, at flowchart block 1202, in one or more of the various embodiments, a client of the spoke file system may provide a file system read command to the spoke file system engine. In some embodiments, read commands may be considered high level commands given in a spoke file system to read data from a file system item. As described in FIG. 5, the read command may initiate a read transaction comprised of one or more read requests that obtain the data needed to satisfy the read command from various locations in the file system.

At flowchart decision block 1204, in one or more of the various embodiments, if the read command may be associated with a spoke item, control may flow to flowchart decision block 1206; otherwise, control may flow to flowchart block 1214.

In some embodiments, file system engines may be arranged to evaluate the read command to determine one or more inodes or inode masks that may represent the file system items that would satisfy the read command. For example, in some embodiments, the read command may include file names, directory names, or the like, that may be mapped to file IDs that may be used to retrieve an inode or inode mask for items associated with the read command. Accordingly, in some embodiments, if the file IDs associated with the read command correspond to an inode, file system engines may assume that the contents for the file system item may be local to the file system. In contrast, in some embodiments, if the file IDs associated with the read command correspond to an inode mask, file system engines may assume that the contents for the file system items of interest may be considered spoke items.

At flowchart decision block 1206, in one or more of the various embodiments, if there may be a valid read lease, control may flow to data block 1214; otherwise, control may flow to flowchart block 1208. As described above, in some embodiments, inode masks may include information about the leases (if any) that have been obtained for the data blocks that comprise the contents of the associate file system item.

In some embodiments, leases may be associated with a range of data blocks. Accordingly, in some embodiments, spoke file system engines may employ the inode mask to determine if data blocks associated with read commands are associated with a valid lease. In some embodiments, if the inode mask does not have references to the data blocks being requested, it may be assumed that a valid lease is absent.

Also, in some embodiments, in cases where the inode mask does list some data blocks that may appear to be responsive to the read commands, file system engines may be arranged to confirm if the associated lease remains in force.

In some embodiments, leases may be considered valid if they have not been revoked since the last time they were issued. Thus, in some embodiments, if no other file system clients in either the spoke file system or the hub file system have caused a previously granted lease to be revoked, the previously granted lease may remain valid.

At flowchart block 1208, in one or more of the various embodiments, the spoke file system engine may be arranged to request a read lease from the hub file system.

In some embodiments, file system engines may be arranged to generate a lease request that includes information about which data blocks are requested and the type of lease (e.g., read or write). For example, if a client is trying to read the first 100 KiB of a file, the generated lease request may include a file ID, initial offset of 0 (top of the file), a run length of 100 KiB or a number of data blocks. (For example, if data blocks are sized to 4 KiB, the run-length may be 25 data blocks.), a date/time of the previous lease (if any), or the like.

In some embodiments, the maximum number of data blocks that may be in one lease may vary depending on administrator preferences. Accordingly, in some embodiments, file system engines may be configured to limit or restrict the size of leases to ensure that the data blocks associated with a lease may be copied from the hub file system to the spoke file system quickly without adding too much latency. Also, in some embodiments, restricting leases may enforce a fine granularity that may enable different clients to obtain non-contending leases on different parts of a file system item.

Accordingly, in some embodiments, if the read command requires more data than can be covered by a single lease, file system engines may be arranged to request multiple leases for the same read command. For example, if the lease size limit is 8 MiB and the file system item of interest is 24 MiB, a read command requesting the list or print the entire file may require at least three 8 MiB leases. Accordingly, in some embodiments, a spoke file system engine may be arranged to make two or more lease requests for the same read command.

At flowchart block 1210, in one or more of the various embodiments, optionally, the data blocks and inode mask may be updated with data from the hub file system.

In one or more of the various embodiments, if the lease request may be satisfied, the hub file system may respond with an acknowledgement of that the lease is granted. And, in some embodiments, if the associated data blocks in the spoke file system need to be loaded, the response from the hub file system may include the one or more data blocks called for in the lease request. Also, in some embodiments, if the associated data blocks in the hub file system have changed since a previously lease by the same spoke, the response granting the lease request may include information about the changes. Sometime this may include updated or new data blocks or other changes, such as deletes, or the like.

Note, this flowchart block is indicated as being optional, because in some cases, for some embodiments, that data of interest may have been changed on the hub file system since that last time (if ever) a lease was acquired for it on the spoke file system.

At flowchart block 1212, in one or more of the various embodiments, the spoke file system engine may be arranged to update the relevant inode mask based on the granted read lease. In some embodiments, if the hub system provided new data blocks, updated data blocks, or deletes, the spoke file system engine may update the inode mask accordingly.

In one or more of the various embodiments, data blocks copied from the hub file system may be stored in the spoke file system and associated with the inode mask. Other file system features, such as data protection, data distribution, encryption, caching (in spoke file system), or the like, may be applied as usual if the data blocks may be stored in the spoke file system.

At flowchart block 1214, in one or more of the various embodiments, the spoke file system engine may be arranged to provide the requested data blocks to the client.

In some embodiments, the leased data blocks may be used to satisfy the read command. Note, in some embodiments, several low-level read request may be required to satisfy one read command. Accordingly, in some embodiments, there may be more leases to acquire, or the like, before the read command may be completely satisfied.

Further, in some embodiments, if the lease request may be denied by the hub file system, spoke file system engines may return an error message, or the like, indicating that the read command may not be able to be completed.

Next, in one or more of the various embodiments, control may be returned to a calling process.

Figure 13:
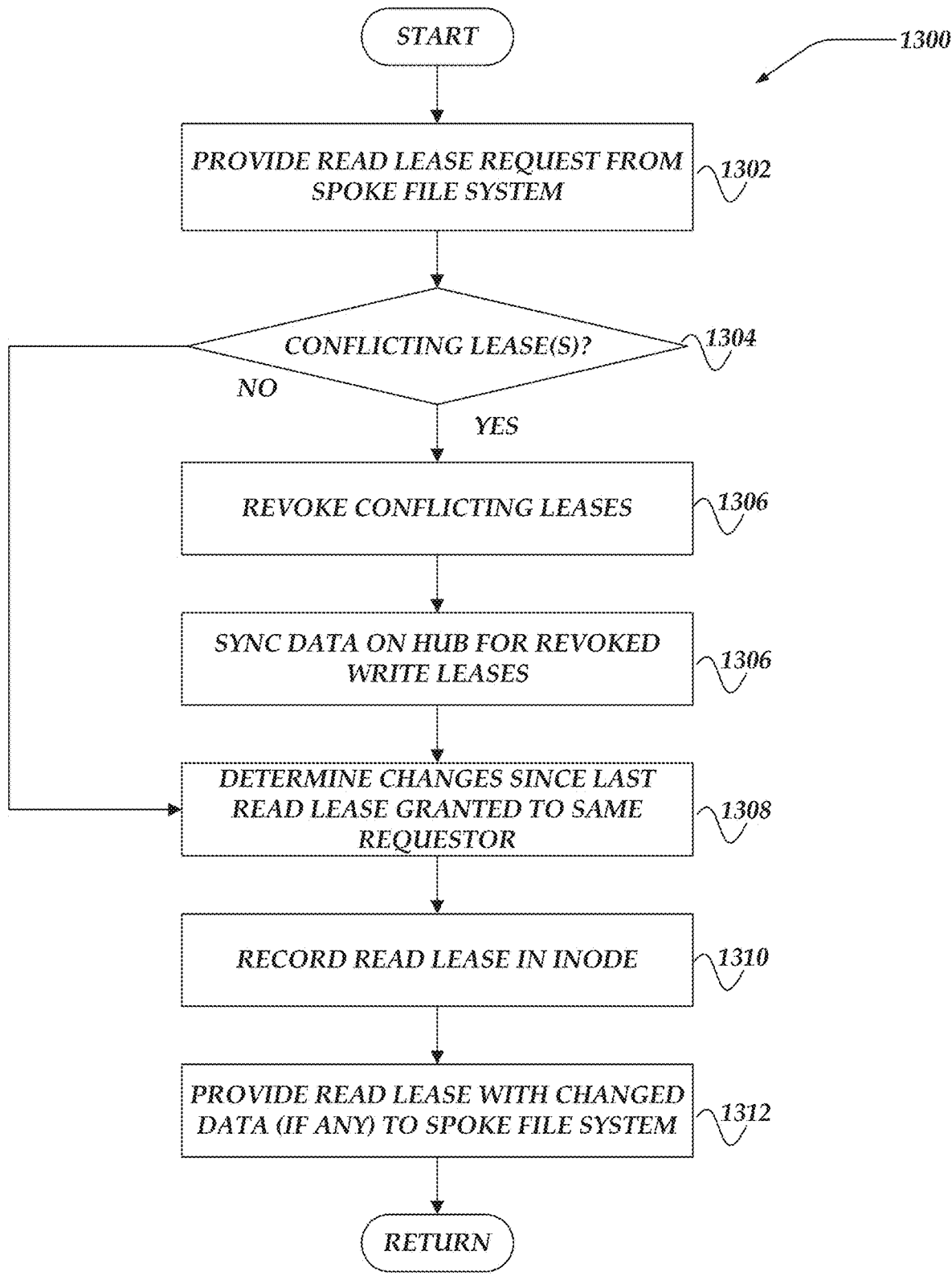
FIG. 13 illustrates a flowchart for a process for sharing namespaces across file system clusters in accordance with one or more of the various embodiments.

FIG. 13 illustrates a flowchart for process 1300 for sharing namespaces across file system clusters in accordance with one or more of the various embodiments. After a start flowchart block, at flowchart block 1302, in one or more of the various embodiments, the hub file system engines may be provided a read lease request from a spoke file system. Note, in some embodiments, process 1300 may be considered to describe how a hub file system engine may respond to read lease requests.

As noted, spoke file system engines may communicate read lease requests to hub file systems.

At flowchart decision block 1304, in one or more of the various embodiments, if there may be one or more contending leases, control may flow to flowchart block 1306; otherwise, control may flow to flowchart block 1308.

In some embodiments, hub file system engines may be arranged to determine a local file ID for the inode associated with the read lease request. Accordingly, in some embodiments, the hub file system engine may be arranged to examine the inode to determine if there may be conflicting leases covering one or more of the data blocks associated with the requested read lease.

In some embodiments, more than one read lease may be granted for the same data blocks. Accordingly, in some embodiments, in general requested read lease may not conflict with existing read leases.

However, in some embodiments, if a write lease may be in force, it may be considered to conflict with the requested read lease.

At flowchart block 1306, in one or more of the various embodiments, the hub file system engine may be arranged to revoke the conflicting leases. Accordingly, in some embodiments, hub file system engines may be arranged to send a message to one or more spoke file system that revoke the conflicting leases.

At flowchart block 1308, in one or more of the various embodiments, the hub file system engine may be arranged to synchronize data on the hub file system the data on the spoke file systems associated with the one or more revoked leases.

In some embodiments, holders of revoked write leases may provide the data blocks of other change information based on write activity in the spoke that may not have been pushed back to the hub file system.

In some embodiments, one or more background processes may be running to generally promulgate changes that occur in the spoke file system to the hub file system. However, if the hub file system may be out of sync with one or more spoke file systems, those spoke file system may provide the change information to the hub file system. Accordingly, in some embodiments, if there were relevant changes, the hub file system engine may update its local copy of the file system item and update its corresponding inode before issue a new lease.

At flowchart block 1310, in one or more of the various embodiments, the hub file system may be arranged to record the new read lease in the inode corresponding to data associated with new read lease. In some embodiments, the new read lease may be recorded in the appropriate inode.

At flowchart block 1312, in one or more of the various embodiments, the hub file system engine may be arranged to provide the read lease along with data changes (if any) to the spoke file system that requested the lease.

Next, in one or more of the various embodiments, control may be returned to a calling process.

Figure 14:
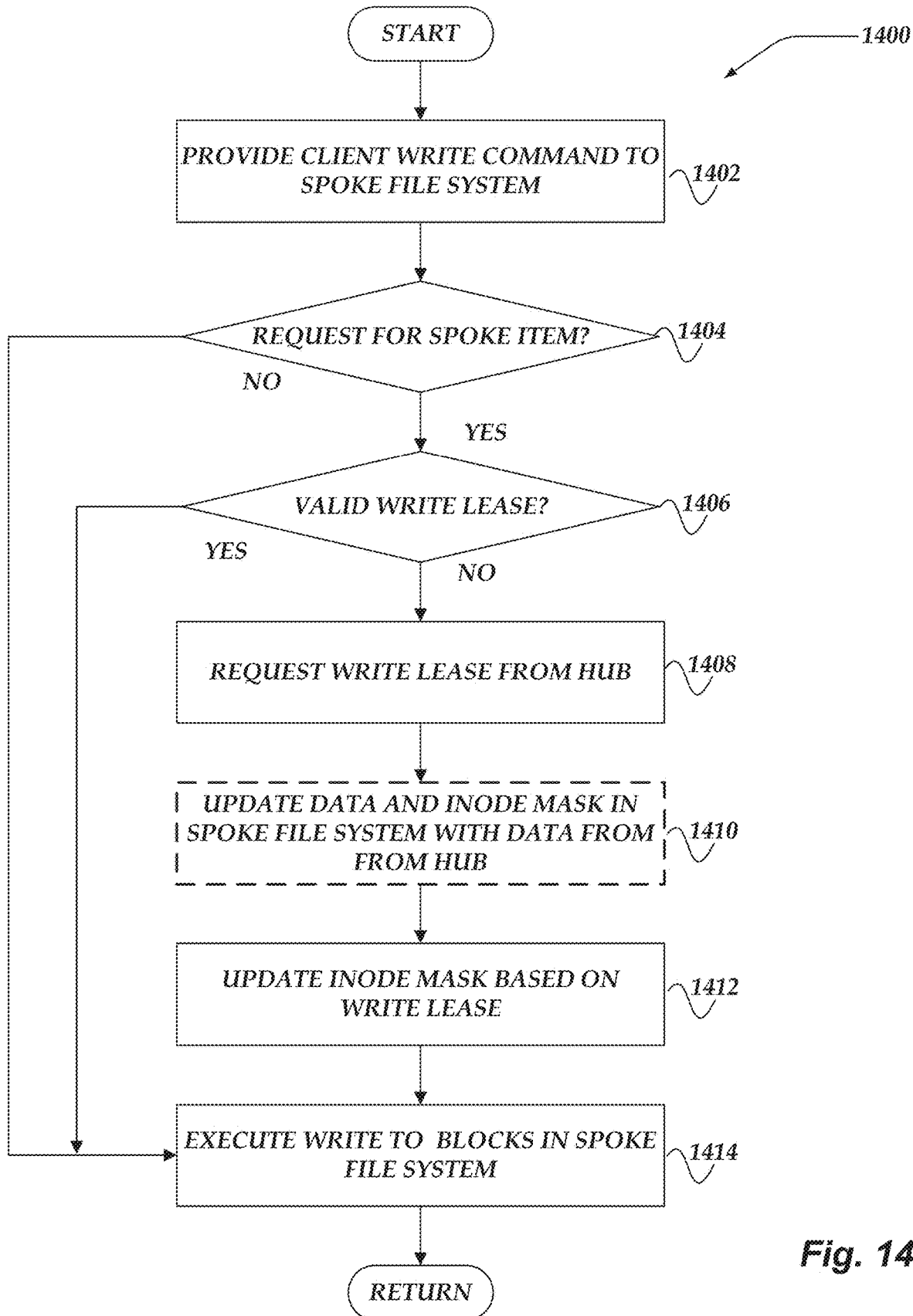
FIG. 14 illustrates a flowchart for a process for sharing namespaces across file system clusters in accordance with one or more of the various embodiments.

FIG. 14 illustrates a flowchart for process 1400 for sharing namespaces across file system clusters in accordance with one or more of the various embodiments. After a start flowchart block, at flowchart block 1402, in one or more of the various embodiments, a client of the spoke file system may provide a write command to a spoke file system engine. In some embodiments, write commands may include client level commands, such as writing to a file, deleting a file, creating a new file, or the like.

At flowchart decision block 1404, in one or more of the various embodiments, if the write command may be associated with a spoke item, control may flow to flowchart decision block 1406; otherwise, control may flow to flowchart decision block 1414. Similar as described above for read lease requests, the spoke file system engine may determine if the file system item that may be that target of the write command may be a spoke item.

At flowchart decision block 1406, in one or more of the various embodiments, if there may be an existing valid write lease for the write requests, control may flow to flowchart block 1414; otherwise, control may flow to flowchart block 1408. Similar, to read leases, write leases may be perpetual until revoked. Accordingly, in some embodiments, if the spoke file system has a valid write lease for the portions of the target file system items that may be affected by the write command, the write may proceed under the existing write lease.

At flowchart block 1408, in one or more of the various embodiments, the spoke file system engine may be arranged to request a write lease from the hub file system. Similar to requesting read leases, if the spoke file system engines need a write lease, it may send a request to the hub file system.

At flowchart block 1410, in one or more of the various embodiments, optionally, the spoke file system engine may be arranged to update its local data and inode mask based on the current data from the hub file system. In some cases, for some embodiments, the hub file system engine may respond to the write lease request with data that may be stored in the spoke file system. For example, if the current version of the data corresponding to a new or renewed write lease may be absent from the spoke file system, the hub file system may provide that data with the write lease acknowledgment.

Note, this flowchart block may be indicated as being optional because in some cases, for some embodiments, the data currently on the spoke file system may be current.

At flowchart block 1412, in one or more of the various embodiments, the spoke file system engine may be arranged to update an inode mask based on the write lease. In some embodiments, inode masks may store lease information for the data represented by the inode mask. Accordingly, in some embodiments, the data location information the inode mask may be updated to include information about the granted write lease.

At flowchart block 1414, in one or more of the various embodiments, the spoke file system engine may be arranged to execute the write request in the spoke file system.

Next, in one or more of the various embodiments, control may be returned to a calling process.

Figure 15:
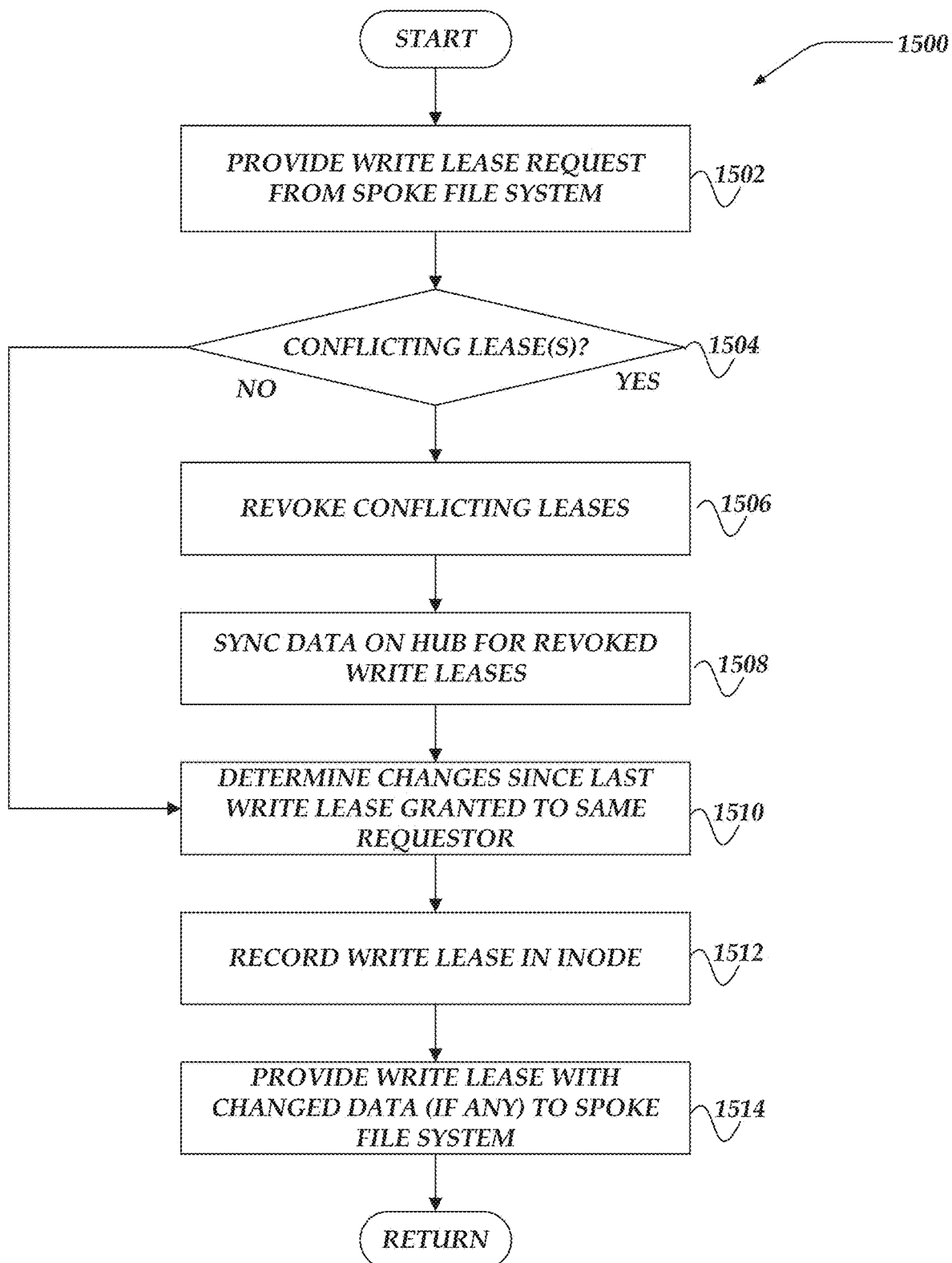
FIG. 15 illustrates a flowchart for a process for sharing namespaces across file system clusters in accordance with one or more of the various embodiments.

FIG. 15 illustrates a flowchart for process 1500 for sharing namespaces across file system clusters in accordance with one or more of the various embodiments. After a start flowchart block, at flowchart block 1502, in one or more of the various embodiments, a request for a write lease may be provided to the hub file system engine. Similar to how read lease requests may be provided (described above) spoke file system engines may be arranged to provide requests for write leases to the hub file system.

At flowchart decision block 1504, in one or more of the various embodiments, if there may be conflicting leases, control may flow to flowchart block 1506; otherwise, control may flow to flowchart block 1510. The actions for this flowchart block may be considered similar to flowchart block 1306 described above, except because it is a request for a write lease, any active leases (read leases or a write lease) that cover the data blocks identified in the write lease request may be considered conflicting lease.

At flowchart block 1506, in one or more of the various embodiments, the hub file system engines may be arranged to revoke the one or more conflicting leases.

At flowchart block 1508, in one or more of the various embodiments, the hub file system engine may be arranged to synchronize data on the hub file system for revoked leases (if needed). In some embodiments, if the spoke file system associated with a revoked write lease has changes that have yet to be merged into the hub file system, that spoke file system may provide the change information or changed data with an acknowledgment that their write lease has been revoked.

At flowchart block 1510, in one or more of the various embodiments, hub file system engines may be arranged to determine if there may be one or more changes to the data corresponding to the requested lease since the last lease was granted to requesting spoke. In some embodiments, lease requests provided by spoke file system engines may include a timestamp, or the like, of the last time a lease granted for the same data blocks of the current lease (if any).

In some embodiments, hub file system engines may be arranged to determine if there may be one or more changes to data in hub file system that may correspond to the write lease that have not previously been shared with the spoke file system. For example, if there may be other writes, deletes, or the like, that have not been previously copied to the spoke file system, the hub file system engine may collect that data and prepare to send it to the spoke file system.

At flowchart block 1512, in one or more of the various embodiments, the hub file system engine may be arranged to record the write lease in the inode associated with the leased data blocks.

At flowchart block 1514, in one or more of the various embodiments, the hub file system engine may be arranged to provide the write lease and changed data (if any) to the spoke file system that may be requesting the write lease.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:
   determining a file system item in a spoke file system based on a command provided to the spoke file system, wherein the file system item is associated with an inode mask associated with an inode on a hub file system;
   determining a plurality of data blocks associated with the file system item based on the command and the inode mask, wherein the plurality of data blocks are absent from the spoke file system;
   generating one or more requests for one or more leases based on the plurality of absent data blocks, wherein each of the one or more lease requests correspond to a portion of the plurality of absent data blocks, and wherein the one or more lease requests are communicated to the hub file system;
   determining an amount of data blocks to associate with each lease based on a time to copy each portion of the absent data blocks from the hub file system to the spoke file system, wherein the time to copy each portion of the absent data blocks from the hub file system to the spoke file system is less than a threshold value; and
   employing the one or more leases provided by the hub file system to perform further actions, including:
      copying each portion of the plurality of absent data blocks from the hub file system to the spoke file system, wherein each portion of the plurality of absent data blocks is associated with a lease;
      updating the inode mask to include the one or more leases and each copied portion of the plurality of absent blocks; and
      employing the copied portions of the plurality of absent blocks to satisfy the command.

2. The method of claim 1, further comprising:
   communicating a request to establish a spoke-hub relationship between the spoke file system and the hub file system, wherein the request includes a mount point in the spoke file system for establishing a spoke and a location in the hub file system that shares one or more file system items to the spoke; and
   establishing the spoke in the spoke file system, wherein the spoke provides shared access in the spoke file system to the one or more file system items shared from the location in the hub file system.

3. The method of claim 1, further comprising:
   determining one or more data blocks stored in the spoke file system that are associated with a valid lease based on the inode mask; and
   employing the one or more data blocks stored in the spoke file system to satisfy the command.

4. The method of claim 1, further comprising:
invalidating the one or more leases based on one or more revocation messages sent by the hub file system, wherein the inode mask is updated to indicate the revocation of the one or more leases; and
reacquiring the one or more leases from the hub file system for the spoke file system based on one or more subsequent commands, wherein the hub file system communicates a current contents of the one or more data blocks that are associated with the reacquired leases to the spoke file system.

5. The method of claim 1, further comprising:
employing a revocation message from the hub file system to invalidate one or more leases;
determining one or more changes to one or more data blocks associated with the one or more leases and stored in the spoke file system;
communicating information about the one or more changes to the hub file system; and
updating the inode mask to indicate that the one or more leases are invalid.

6. The method of claim 1, further comprising:
determining the inode in the hub file system that corresponds to the inode mask based on the one or more lease requests;
determining one or more data blocks stored in the hub file system based on the inode and the one or more lease requests;
determining one or more active leases associated with the one or more data blocks;
revoking the one or more active leases associated with the one or more data blocks, wherein the hub file system communicates a revocation message to one or more other spoke file systems associated with the one or more active leases, and wherein one or more changes to the one or more data blocks are copied from the one or more other spoke file systems to the hub file system;
generating the one or more leases based on the one or more lease requests; and
communicating the one or more leases to the spoke file system.

7. A system for managing data in a file system comprising:
a network computer, comprising:
  a memory that stores at least instructions; and
  one or more processors that execute instructions that are configured to cause performance of actions, including:
    determining a file system item in a spoke file system based on a command provided to the spoke file system, wherein the file system item is associated with an inode mask associated with an inode on a hub file system;
    determining a plurality of data blocks associated with the file system item based on the command and the inode mask, wherein the plurality of data blocks are absent from the spoke file system;
    generating one or more requests for one or more leases based on the plurality of absent data blocks, wherein each of the one or more lease requests correspond to a portion of the plurality of absent data blocks, and wherein the one or more lease requests are communicated to the hub file system;
    determining an amount of data blocks to associate with each lease based on a time to copy each portion of the absent data blocks from the hub file system to the spoke file system, wherein the time to copy each portion of the absent data blocks from the hub file system to the spoke file system is less than a threshold value; and
    employing the one or more leases provided by the hub file system to perform further actions, including:
      copying each portion of the plurality of absent data blocks from the hub file system to the spoke file system, wherein each portion of the plurality of absent data blocks is associated with a lease;
      updating the inode mask to include the one or more leases and each copied portion of the plurality of absent blocks; and
      employing the copied portions of the plurality of absent blocks to satisfy the command; and
one or more client computers, comprising:
  a memory that stores at least instructions; and
  one or more processors that execute instructions that are configured to cause performance of other actions, including:
    communicating the command to the spoke file system.

8. The system of claim 7, wherein the one or more network computer processors execute instructions that are configured to cause performance of actions, further comprising: communicating a request to establish a spoke-hub relationship between the spoke file system and the hub file system, wherein the request includes a mount point in the spoke file system for establishing a spoke and a location in the hub file system that shares one or more file system items to the spoke; and
establishing the spoke in the spoke file system, wherein the spoke provides shared access in the spoke file system to the one or more file system items shared from the location in the hub file system.

9. The system of claim 7, wherein the one or more network computer processors execute instructions that are configured to cause performance of actions, further comprising: determining one or more data blocks stored in the spoke file system that are associated with a valid lease based on the inode mask; and
employing the one or more data blocks stored in the spoke file system to satisfy the command.

10. The system of claim 7, wherein the one or more network computer processors execute instructions that are configured to cause performance of actions, further comprising: invalidating the one or more leases based on one or more revocation messages sent by the hub file system, wherein the inode mask is updated to indicate the revocation of the one or more leases; and
reacquiring the one or more leases from the hub file system for the spoke file system based on one or more subsequent commands, wherein the hub file system communicates a current contents of the one or more data blocks that are associated with the reacquired leases to the spoke file system.

11. The system of claim 7, wherein the one or more network computer processors execute instructions that are configured to cause performance of actions, further comprising: employing a revocation message from the hub file system to invalidate one or more leases;
determining one or more changes to one or more data blocks associated with the one or more leases and stored in the spoke file system;
communicating information about the one or more changes to the hub file system; and updating the inode mask to indicate that the one or more leases are invalid.

12. The system of claim 7, wherein the one or more network computer processors execute instructions that are configured to cause performance of actions, further comprising: determining the inode in the hub file system that corresponds to the inode mask based on the one or more lease requests;
determining one or more data blocks stored in the hub file system based on the inode and the one or more lease requests;
determining one or more active leases associated with the one or more data blocks;
revoking the one or more active leases associated with the one or more data blocks, wherein the hub file system communicates a revocation message to one or more other spoke file systems associated with the one or more active leases, and wherein one or more changes to the one or more data blocks are copied from the one or more other spoke file systems to the hub file system;
generating the one or more leases based on the one or more lease requests; and
communicating the one or more leases to the spoke file system.

13. A processor readable non-transitory storage media that includes instructions for managing data in a file system over a network, wherein execution of the instructions by one or more processors on one or more network computers performs actions, comprising:
determining a file system item in a spoke file system based on a command provided to the spoke file system, wherein the file system item is associated with an inode mask associated with an inode on a hub file system;
determining a plurality of data blocks associated with the file system item based on the command and the inode mask, wherein the plurality of data blocks are absent from the spoke file system;
generating one or more requests for one or more leases based on the plurality of absent data blocks, wherein each of the one or more lease requests correspond to a portion of the plurality of absent data blocks, and wherein the one or more lease requests are communicated to the hub file system;
determining an amount of data blocks to associate with each lease based on a time to copy each portion of the absent data blocks from the hub file system to the spoke file system, wherein the time to copy each portion of the absent data blocks from the hub file system to the spoke file system is less than a threshold value; and
employing the one or more leases provided by the hub file system to perform further actions, including:
copying each portion of the plurality of absent data blocks from the hub file system to the spoke file system, wherein each portion of the plurality of absent data blocks is associated with a lease;
updating the inode mask to include the one or more leases and each copied portion of the plurality of absent blocks; and
employing the copied portions of the plurality of absent blocks to satisfy the command.

14. The media of claim 13, further comprising:
communicating a request to establish a spoke-hub relationship between the spoke file system and the hub file system, wherein the request includes a mount point in the spoke file system for establishing a spoke and a location in the hub file system that shares one or more file system items to the spoke; and
establishing the spoke in the spoke file system, wherein the spoke provides shared access in the spoke file system to the one or more file system items shared from the location in the hub file system.

15. The media of claim 13, further comprising:
determining one or more data blocks stored in the spoke file system that are associated with a valid lease based on the inode mask; and
employing the one or more data blocks stored in the spoke file system to satisfy the command.

16. The media of claim 13, further comprising:
invalidating the one or more leases based on one or more revocation messages sent by the hub file system, wherein the inode mask is updated to indicate the revocation of the one or more leases; and
reacquiring the one or more leases from the hub file system for the spoke file system based on one or more subsequent commands, wherein the hub file system communicates a current contents of the one or more data blocks that are associated with the reacquired leases to the spoke file system.

17. The media of claim 13, further comprising:
employing a revocation message from the hub file system to invalidate one or more leases;
determining one or more changes to one or more data blocks associated with the one or more leases and stored in the spoke file system;
communicating information about the one or more changes to the hub file system; and
updating the inode mask to indicate that the one or more leases are invalid.

18. The media of claim 13, further comprising:
determining the inode in the hub file system that corresponds to the inode mask based on the one or more lease requests;
determining one or more data blocks stored in the hub file system based on the inode and the one or more lease requests;
determining one or more active leases associated with the one or more data blocks;
revoking the one or more active leases associated with the one or more data blocks, wherein the hub file system communicates a revocation message to one or more other spoke file systems associated with the one or more active leases, and wherein one or more changes to the one or more data blocks are copied from the one or more other spoke file systems to the hub file system;
generating the one or more leases based on the one or more lease requests; and
communicating the one or more leases to the spoke file system.

19. A network computer for managing data in a file system, comprising:
a memory that stores at least instructions; and
one or more processors that execute instructions that are configured to cause performance of actions, including:
determining a file system item in a spoke file system based on a command provided to the spoke file system, wherein the file system item is associated with an inode mask associated with an inode on a hub file system;
determining a plurality of data blocks associated with the file system item based on the command and the inode mask, wherein the plurality of data blocks are absent from the spoke file system;
generating one or more requests for one or more leases based on the plurality of absent data blocks, wherein each of the one or more lease requests correspond to a portion of the plurality of absent data blocks, and wherein the one or more lease requests are communicated to the hub file system;

determining an amount of data blocks to associate with each lease based on a time to copy each portion of the absent data blocks from the hub file system to the spoke file system, wherein the time to copy each portion of the absent data blocks from the hub file system to the spoke file system is less than a threshold value; and employing the one or more leases provided by the hub file system to perform further actions, including:

copying each portion of the plurality of absent data blocks from the hub file system to the spoke file system, wherein each portion of the plurality of absent data blocks is associated with a lease;

updating the inode mask to include the one or more leases and each copied portion of the plurality of absent blocks; and employing the copied portions of the plurality of absent blocks to satisfy the command.

20. The network computer of claim 19, wherein the one or more processors execute instructions that are configured to cause performance of actions, further comprising:

communicating a request to establish a spoke-hub relationship between the spoke file system and the hub file system, wherein the request includes a mount point in the spoke file system for establishing a spoke and a location in the hub file system that shares one or more file system items to the spoke; and establishing the spoke in the spoke file system, wherein the spoke provides shared access in the spoke file system to the one or more file system items shared from the location in the hub file system.

21. The network computer of claim 19, wherein the one or more processors execute instructions that are configured to cause performance of actions, further comprising:

determining one or more data blocks stored in the spoke file system that are associated with a valid lease based on the inode mask; and employing the one or more data blocks stored in the spoke file system to satisfy the command.

22. The network computer of claim 19, wherein the one or more processors execute instructions that are configured to cause performance of actions, further comprising:

invalidating the one or more leases based on one or more revocation messages sent by the hub file system, wherein the inode mask is updated to indicate the revocation of the one or more leases; and reacquiring the one or more leases from the hub file system for the spoke file system based on one or more subsequent commands, wherein the hub file system communicates a current contents of the one or more data blocks that are associated with the reacquired leases to the spoke file system.

23. The network computer of claim 19, wherein the one or more processors execute instructions that are configured to cause performance of actions, further comprising:

employing a revocation message from the hub file system to invalidate one or more leases;

determining one or more changes to one or more data blocks associated with the one or more leases and stored in the spoke file system;

communicating information about the one or more changes to the hub file system; and updating the inode mask to indicate that the one or more leases are invalid.

24. The network computer of claim 19, wherein the one or more processors execute instructions that are configured to cause performance of actions, further comprising:

determining the inode in the hub file system that corresponds to the inode mask based on the one or more lease requests;

determining one or more data blocks stored in the hub file system based on the inode and the one or more lease requests;

determining one or more active leases associated with the one or more data blocks;

revoking the one or more active leases associated with the one or more data blocks, wherein the hub file system communicates a revocation message to one or more other spoke file systems associated with the one or more active leases, and wherein one or more changes to the one or more data blocks are copied from the one or more other spoke file systems to the hub file system;

generating the one or more leases based on the one or more lease requests; and communicating the one or more leases to the spoke file system.

* * * * *